United States Patent
Padmanabhan et al.

(10) Patent No.: US 11,372,635 B2
(45) Date of Patent: Jun. 28, 2022

(54) IN-MEMORY SOFTWARE PACKAGE INSTALLATION AND TESTING

(71) Applicant: salesforce.com, inc., San Francisco, CA (US)

(72) Inventors: Prithvi Krishnan Padmanabhan, San Ramon, CA (US); Jason Lantz, Plano, TX (US)

(73) Assignee: salesforce.com, inc., San Francisco, CA (US)

( * ) Notice: Subject to any disclaimer, the term of this patent is extended or adjusted under 35 U.S.C. 154(b) by 19 days.

(21) Appl. No.: 16/887,880

(22) Filed: May 29, 2020

(65) Prior Publication Data

US 2021/0373878 A1    Dec. 2, 2021

(51) Int. Cl.
| | |
|---|---|
| *G06F 9/445* | (2018.01) |
| *G06F 8/654* | (2018.01) |
| *G06F 16/958* | (2019.01) |
| *G06F 16/907* | (2019.01) |
| *G06F 8/61* | (2018.01) |

(52) U.S. Cl.
CPC .............. *G06F 8/654* (2018.02); *G06F 8/61* (2013.01); *G06F 16/907* (2019.01); *G06F 16/958* (2019.01)

(58) Field of Classification Search
CPC ...... G06F 8/654; G06F 16/907; G06F 16/958; G06F 8/61

USPC .................................................. 717/124–130
See application file for complete search history.

(56) References Cited

U.S. PATENT DOCUMENTS

| | | | |
|---|---|---|---|
| 2015/0356002 A1* | 12/2015 | Arif .......................... | G06F 8/60 714/38.1 |
| 2020/0250176 A1* | 8/2020 | Padmanabhan ........... | G06F 8/61 |

* cited by examiner

*Primary Examiner* — Chuck O Kendall
(74) *Attorney, Agent, or Firm* — Holland & Hart LLP

(57) ABSTRACT

Methods, systems, and devices supporting in-memory software package installation and testing are described. Some systems (e.g., a multi-tenant cloud computing platform) may support installation of software packages, where each package may be defined by a set of metadata. If a tenant selects to install a package, the system may test the package for conflicts between the package and the tenant's production environment. The system may automatically detect additional packages linked to the package based on dependencies defined in the metadata and may temporarily install the one or more packages in-memory at one or more servers. The system may pull a subset of data from the tenant's production environment into the in-memory testing environment based on a metadata testing file in order to support running tests defined by the metadata testing file. The system may test the package(s) in-memory at the server(s) for any conflicts using the metadata testing file.

23 Claims, 11 Drawing Sheets

IN-MEMORY SOFTWARE PACKAGE INSTALLATION AND TESTING

FIELD OF TECHNOLOGY

The present disclosure relates generally to database systems and data processing, and more specifically to in-memory software package installation and testing.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform, such as a multi-tenant cloud platform, may support production environments for multiple tenants that run on underlying database systems. Some cloud platforms may further support installation of one or more software packages for the tenants. Each package may include a set of dependencies and may modify a portion of a tenant's production environment. If a cloud platform supports robust customizations and process flows on a tenant-by-tenant basis, testing packages prior to installation may be extremely complex. Handling testing for package installation manually may fail to support specific customizations, process flows, or both. In some cases, installing a package to a tenant's production environment without thorough testing may potentially break customizations, processes, functions, or other code supporting the tenant's production environment.

DETAILED DESCRIPTION

Figure 1:
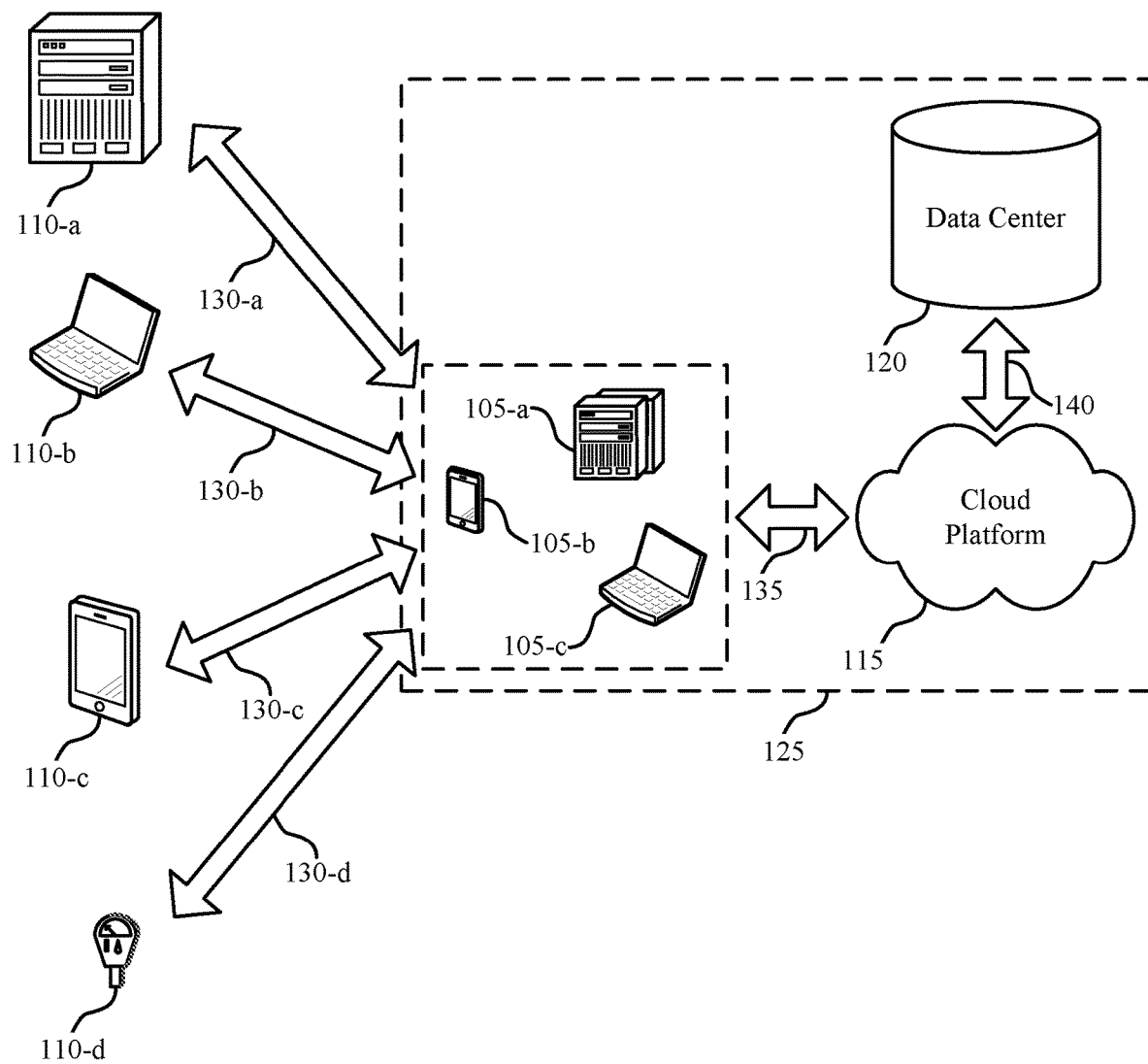
FIG. 1 illustrates an example of a system for cloud computing that supports in-memory software package installation and testing in accordance with aspects of the present disclosure.

Some systems, such as multi-tenant cloud computing systems, may support production environments for multiple tenants that run on underlying database systems. In some cases, a system may further support installation of one or more software packages for the tenants. Each package may be defined by a set of metadata indicating objects for the package, processes for the package, dependencies for the package, or a combination thereof. If a system supports robust customizations and process flows on a tenant-by-tenant basis, testing packages prior to installation may be extremely complex. In some examples, handling testing for package installation manually may fail to support specific customizations, process flows, or both. Additionally or alternatively, using a sandbox environment to test package installation may involve a significant processing overhead, a significant processing latency, or both in order to replicate a tenant's production environment into a sandbox environment for package testing.

To support efficient, secure package installation testing, a system may implement automated package installation testing in an in-memory testing environment. For example, a user associated with a tenant may select a package to install in the tenant's production environment. The system may temporarily install the package in-memory at one or more servers and may make a metadata testing file available to the one or more servers to use in the in-memory testing environment, where the metadata testing file may be an example of a configuration file including a set of process flows, a set of customizations, or both. Based on the metadata testing file, the system may pull a subset of data from the tenant's production environment into the in-memory testing environment in order to support running the tests defined in the metadata testing file. The system may test the package in-memory at the one or more servers for any conflicts using the metadata testing file. For example, the one or more servers may identify any errors or inconsistencies based on running the tests in the metadata testing file on the objects defined by the installed package and the objects retrieved from the tenant's production environment. If the one or more servers detect any errors, the system may surface the errors to a user with suggested updates or may automatically perform one or more updates (e.g., to bridge any gaps between the package to install and the tenant's production environment). If the package passes the tests, the system may automatically install the package in the tenant's production environment, for example, with any updates applied in the in-memory testing environment in order for the package to pass the tests.

In some cases, the system may support dynamically inferring package dependencies. For example, the system may analyze the metadata of a package to determine any other packages on which the package depends, any other packages that depend on the package, or both. In some examples, the system may automatically install these additional packages with the selected package in-memory for testing. In some other examples, the system may surface a list of suggested packages to install along with a selected package (e.g., based on a metadata-driven dependency tree).

The system may test these packages in a single tenant-specific in-memory testing environment. By using the in-memory testing environment, the system may avoid committing any transactions to persistent systems during package installation testing. Additionally or alternatively, the system may flush the data from the in-memory testing environment to support reusing the memory resources upon completion of package testing for the tenant.

The metadata testing file may be generated automatically by the system, manually by a user, or a combination thereof. For example, the system may identify customizations, process flows, or both to test for a tenant and may generate one or more portions of the metadata testing file based on the identified information. In some cases, a user may programmatically or declaratively define one or more tests for the metadata testing file. In a specific implementation, the system may support a recorder tool. The recorder tool may record user interactions with a user interface and may use the recorded information to generate metadata-driven instructions for the metadata testing file. In some examples, the metadata testing file may support testing customizations, process flows, or both for different user profiles, different permissions, or a combination thereof. In some cases, each metadata testing file may be tenant-specific.

Aspects of the disclosure are initially described in the context of an environment supporting an on-demand database service. Additional aspects of the disclosure are described with reference to systems, recording techniques, and process flows for package testing. Aspects of the disclosure are further illustrated by and described with reference to apparatus diagrams, system diagrams, and flowcharts that relate to in-memory software package installation and testing.

FIG. 1 illustrates an example of a system 100 for cloud computing that supports in-memory software package installation and testing in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may support automated package installation testing. For example, the system 100 may support a multi-tenant cloud computing platform (e.g., cloud platform 115). The system 100 may test business use cases, customizations, or both for a tenant for package installation. Additionally or alternatively, the system 100 may dynamically infer package dependencies based on package metadata.

In some examples, the system 100 may test the customizations, business flows (e.g., process flows), or both for a tenant based on packages currently installed for the tenant and packages selected for installation for the tenant. Such tests may include significant complexities, especially for tenants having a relatively large number of customizations (e.g., greater than a threshold number), complicated process flows including multiple installed packages, or both. To support testing, the system 100 may install one or more managed packages into an in-memory data store at one or more servers. Additionally, the system 100 may load an in-memory copy of customizations, package states, data, or some combination thereof for a tenant into the in-memory data store at the one or more servers. The system 100 may use this in-memory environment for testing package installation based on the tenant's customizations, business flows, or both.

The system 100 may test a set of metadata features based on a metadata testing file. For example, the metadata testing file may define metadata for testing the tenant's customizations, business flows, or both. In some examples, the testing may involve testing the metadata features using different user profiles, different assigned permissions, or a combination thereof. In some examples, the system 100 may automatically identify process flows (e.g., business processes) to test for package installation. Additionally or alternatively, a user may specify one or more process flows to test, for example, programmatically or declaratively (e.g., using a recorder, such as a screen recorder tool) in metadata. For example, the recorder may store user processes as metadata that can be user-specific, tenant-specific, or both. The system 100 may install the packages in-memory of at least one server and may automatically run the metadata testing file defining the tests (e.g., automatically-defined tests, user-defined tests, or both). The testing may determine if any customizations, business processes, or both may break when the one or more new packages are installed. Additionally or alternatively, the system 100 may recommend for a user to perform one or more changes to fix or otherwise mitigate any identified errors. In some cases, the system 100 may automatically perform one or more changes to fix or otherwise mitigate the errors. If the testing results in no errors, the system 100 may determine that the packages may support installation in the tenant's production environment (e.g., without breaking customizations, business processes, or both). Accordingly, the system 100 may automatically install the package in a tenant's production environment upon a success result of the package installation testing. A package installed in a production environment may work on a persistent system and support one or more database-driven applications.

In some other systems, packages may be installed into production environments without proper testing. Such installations may be successful in a default persistent system, but specific tenant customizations or process flows may break based on a newly installed package. As such, testing package installation based on a default system or using manual testing methods may fail to identify one or more errors, potentially causing loss or mishandling of tenant data if the package is installed in the production environment. Alternatively, some other systems may utilize a sandbox environment for testing package installation. For example, such systems may fully replicate a tenant's production environment into a sandbox environment for testing (e.g., creating a separate instance of a tenant's metadata in the sandbox environment). Such a replication process may involve a significant processing overhead and a significant processing latency. Furthermore, the sandbox environment may be a copy of the production environment at a specific point in time and, as such, the sandbox environment may easily go out-of-sync with the production environment, liming the effectiveness of testing in the sandbox environment (e.g., without first performing a costly synchronization of the sandbox environment with the current production environment).

In a specific example, a user may select a package to install for a tenant, log into a sandbox environment for the tenant, and update the sandbox environment to match the tenant's production environment. In some cases, the user may manually identify any dependent packages to install with the selected package (e.g., by reading documentation associated with the package(s)). If the user misses a dependency, the packages may fail one or more tests. The user may install and test the package(s) in the sandbox environment. The user may apply one or more customizations in the sandbox environment to achieve a successful test of the package(s). In some examples, the user may manually test one or more business flows or customizations critical to the tenant. When the user determines that the package is ready for installation, the user may install the package in the tenant's production environment and may manually re-apply the one or more customizations to the production environment. Such a testing procedure may involve significant processing resources and latency involved in preparing the sandbox environment. Furthermore, the testing procedure may be susceptible to human error and may fail to test specific use cases, customizations, process flows, package dependencies, or a combination thereof for a specific tenant.

In contrast, system 100 may use an in-memory testing environment for automated package installation testing. For example, the system 100 may dynamically determine package dependencies based on package metadata. Additionally, the system 100 may select a subset of tenant data to pull into memory of a server for package testing, rather than replicate the entire production environment for the tenant into a sandbox. By selecting a subset of data based on a metadata testing file, the server may support fully testing the package while significantly reducing the processing overhead and latency associated with preparing the testing environment (e.g., by using an in-memory data store of a server rather than a sandbox environment). Additionally, by leveraging metadata to determine process flows and customizations for testing, the system 100 may mitigate the effects of human error and automatically determine the tests to run based on a tenant's production environment. Accordingly, the system 100 may support secure, efficient, and thorough package installation testing for a tenant in a multi-tenant cloud computing system (e.g., without affecting the tenant's production environment).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
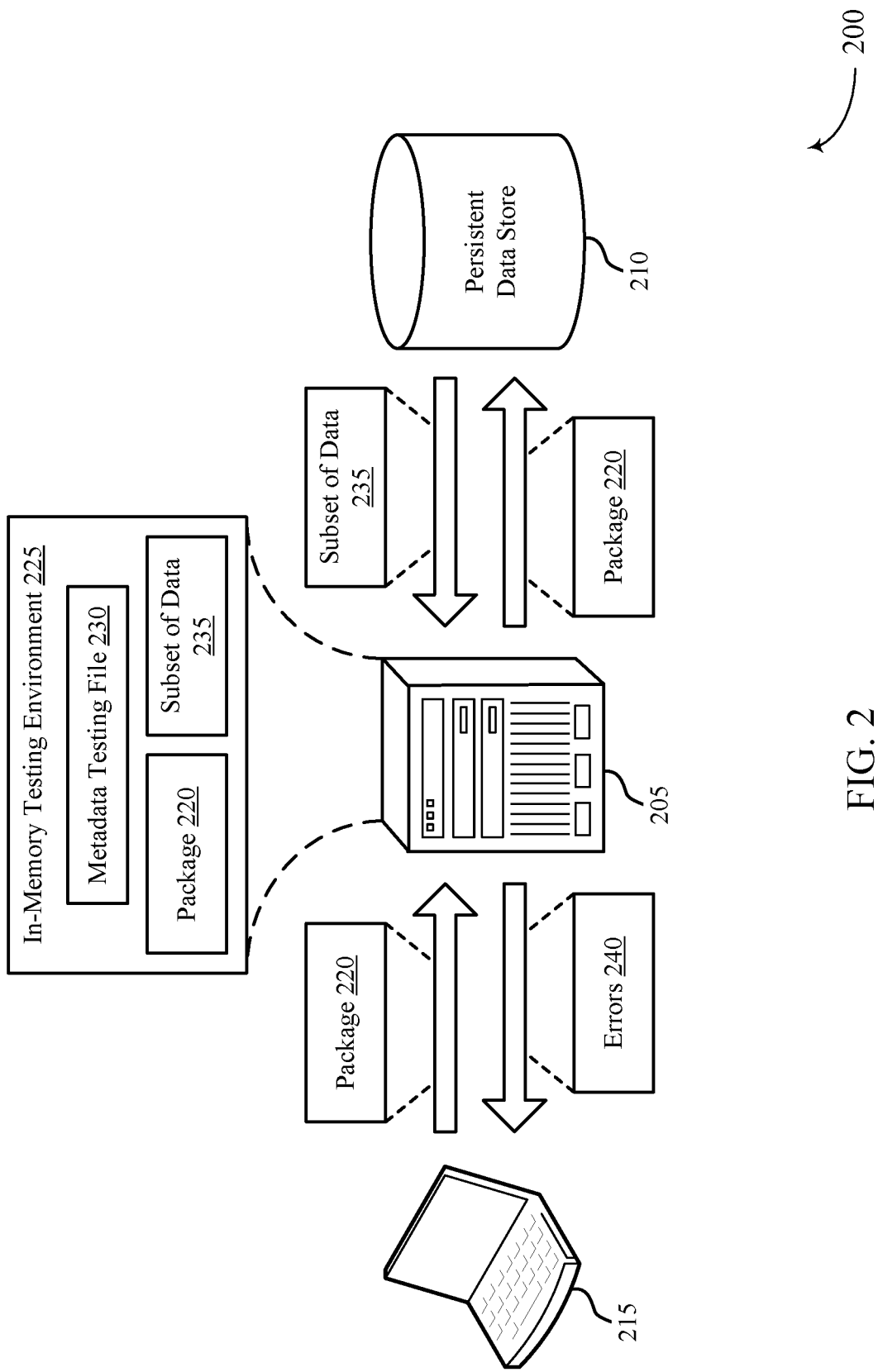
FIGS. 2 and 3 illustrate examples of systems that support in-memory software package installation and testing in accordance with aspects of the present disclosure.

FIG. 2 illustrates an example of a system 200 that supports in-memory software package installation and testing in accordance with aspects of the present disclosure. In some examples, the system 200 may implement aspects of a system 100 as described with reference to FIG. 1. For example, the system 200 may be an aspect of a multi-tenant cloud computing platform. The system 200 may include a server 205, which may be an example of a single server, a server cluster, an application server, a database server, a cloud-based server, a virtual machine, a container, a worker, or any combination of these or other devices or systems supporting data processing. The server 205 may host an in-memory testing environment 225 for secure, efficient package 220 testing.

The system 200 may support multiple tenants in a multi-tenant cloud computing platform. Each tenant may securely store tenant-specific data at one or more persistent data stores 210. A persistent data store 210 may be an example of a database (e.g., a relational database), a data lake, a database management system (DBMS), or any other system supporting non-volatile data storage. Each tenant may additionally apply any number of tenant-specific customizations at the persistent data store 210 (e.g., custom data objects, custom data fields, custom rules, custom formulas, custom process flows, etc.). In some examples, a tenant may additionally or alternatively have one or more previously installed packages operating on the persistent data store 210. Such packages may support one or more database-driven applications that may access data stored at the persistent data store 210, modify data stored at the persistent data store 210, or both.

A tenant may select to install a new package 220 to run on the cloud computing platform (or to otherwise communicate with the cloud computing platform). For example, a user operating a user device 215 may select an application to install. The application may correspond to a software package 220. In some examples, the software package 220 may be a set of metadata including a set of core rules that runs on a multi-tenant environment and is installed for a specific tenant. In some cases, the software package 220 may support one or more process flows (e.g., business flows for interacting with data for a tenant). The user device 215 may send an indication of the selected package 220 to at least one server 205 operating in the system 200. The server 205—or a set of servers 205—may test the package 220 prior to committing the package 220 to one or more persistent systems (e.g., the persistent data store 210). For example, when selecting a package 220 to install for a tenant, a user may not be able to determine how installing the package 220 will affect the customizations, current process flows, or both for the tenant. The testing may mitigate errors associated with installing the package 220.

In some examples, the server 205 may receive a single package 220 for testing and installation. In some other examples, the server 205 may receive a set of multiple packages 220. In some cases, the user may select multiple packages 220 for installation at the user device 215. Additionally or alternatively, the user device 215 or the server 205 may identify a set of related packages for a selected package 220 (e.g., based on package metadata). For example, the selected package 220 may depend on one or more other packages (e.g., "parent" packages), and the system 200 may determine to additionally install the one or more parent packages with the selected package 220. Additionally or alternatively, the system 200 may identify one or more packages dependent on the selected package 220 (e.g., "child" packages) and may suggest installing or may automatically install the one or more child packages with the selected package 220. In some cases, the server 205 may determine an order for installation of the packages 220 based on the dependencies between packages 220 (e.g., based on the metadata for the packages 220, a metadata application programming interface (API), or both).

The server 205 may install the identified one or more packages 220 at an in-memory data store of at least the server 205. The server 205 may host an in-memory testing environment 225 for testing installation of the one or more packages 220 in the in-memory data store. By performing the testing in this in-memory testing environment 225, the server 205 may ensure that the tests do not affect tenant data or break existing customizations, process flows, or applications for the tenant in the cloud computing platform. As such, the server 205 may perform testing in a virtual environment space in memory such that the testing does not affect a production environment (i.e., the server 205 may not commit any transactions on data stored in a persistent data store 210 throughout the testing process). The server 205 may trash the in-memory testing environment 225 (e.g., flush the information related to a package installation test from memory) upon completion of the testing.

The installation testing may be metadata-driven. For example, the server 205 may perform testing according to a metadata testing file 230, such as an extensible markup language (XML) file, a JavaScript Object Notation (JSON) file, or some combination of these or other metadata files. In some cases, a user may define the metadata testing file 230 for a specific tenant (e.g., in a user interface of the user device 215). For example, a user may define—in metadata—a set of process flows (e.g., business processes) and customizations to test for an organization (Org) (e.g., a tenant of the cloud computing platform). Additionally or alternatively, the server 205 or cloud computing platform may generate one or more portions of the metadata testing file 230 automatically based on process flows performed by users, customizations for the tenant, or both. For example, the server 205 or cloud computing platform may analyze the tenant's production environment to determine one or more tests for the metadata testing file 230. In some implementations, the metadata testing file 230 may be defined for a specific tenant. For each package installation for that tenant, the server 205 may use the tenant-specific metadata testing file 230 to determine whether installing the package 220 may break current process flows, customizations, or both for the tenant (e.g., as defined by the metadata testing file 230). For example, the server 205 may run all tests defined in the tenant-specific metadata testing file 230 irrespective of the package 220 for testing.

To support testing of the one or more packages 220, the server 205 may retrieve a subset of data 235 from a persistent data store 210 to run the tests defined in the metadata testing file 230. For example, the persistent data store 210 may include data objects stored for a specific tenant of the multi-tenant cloud computing platform. These data objects may support one or more database-driven applications running on the persistent data store 210. Rather than replicate a full dataset for the tenant in order to run the tests, the server 205 may identify a subset of data 235 to replicate for testing. For example, the server 205 may determine a set of objects for one or more database-driven applications to retrieve from the persistent data store 210 that supports running each of the tests defined by the metadata testing file 230. The server 205 may implement a sampling procedure to select the subset of data 235 in a random or pseudo-random manner. For example, if the metadata testing file 230 includes a test (e.g., a process flow) involving an Account object stored in the persistent data store 210, the sampling procedure may select an Account object from a set of Account objects stored in the persistent data store 210 for the tenant. The server 205 may retrieve (e.g., replicate) the selected Account object from the persistent data store 210 and may store the selected Account object in the in-memory testing environment 225. By using the sampling procedure and the metadata testing file 230, the server 205 may create an in-memory testing environment 225 that supports all of the tests defined in the metadata testing file 230 while maintaining a relatively low testing overhead and latency (e.g., as compared to replicating all of a tenant's data into a sandbox environment). That is, rather than replicating all of the tenant's Account objects, the server 205 may select a relatively small subset of the tenant's Account objects (e.g., one or more objects) to pull into memory for testing based on metadata. Additionally or alternatively, the server 205 may retrieve the subset of data 235 from the persistent data store 210 at a data object level, a data field level, or some combination thereof.

In some cases, retrieving the subset of data 235 from the persistent data store 210 may allow the server 205 to capture customizations in the in-memory testing environment 225. For example, the persistent data store 210 may include a number of user customizations, tenant (e.g., organizational) customizations, or both. A customization may include a custom data object, a custom data field, a custom data schema, a custom database-driven application, a custom process flow (e.g., business process), a custom protocol (e.g., security protocol, visibility protocol, etc.), or a combination thereof. The server 205 may retrieve the subset of data 235 according to the customizations applied at the persistent data store 210, such that these customizations are propagated to the in-memory testing environment 225 for the tenant. As such, the server 205 may install an immediate snapshot of a portion of a tenant's production environment into the in-memory testing environment 225 (e.g., including the tenant's customizations). If the tenant corresponds to an Org, this in-memory testing environment 225 may be referred to as a "Virtual Org." To reduce the processing overhead, the snapshot may not capture the full production environment, but may instead capture a subset of data 235 from the tenant's production environment that supports all of the tests defined by the metadata testing file 230.

Once the server 205 has built the in-memory testing environment 225—or, in some cases, as the server 205 is building the in-memory testing environment 225—the server 205 may test one or more packages 220. Testing a package 220 may involve testing for any conflicts between the set of objects defined in the package 220 and the set of objects defined in the persistent data store 210. By using the retrieved subset of data 235 as a proxy for the objects defined in the persistent data store 210, the server 205 may ensure that the testing does not affect the persistent data store 210. That is, the server 205 may perform operations on the subset of data 235 stored in the in-memory testing environment 225 when running the tests for the metadata testing file 230, such that the server 205 may refrain from committing any transactions to the persistent data store 210 or any other persistent system during testing.

The server 205 may operate the installed software package 220 according to the metadata testing file 230 and based on the retrieved subset of data 235 at the in-memory testing environment 225 of at least the server 205. For example, the server 205 may run a set of process flows defined by the metadata testing file 230 on the installed software package 220 and the subset of data 235 to catch any errors. In some cases, the server 205 may perform the testing on multiple installed software packages 220, for example, based on the dependencies between the packages 220. If the server 205 identifies an error (e.g., corresponding to a conflict between the objects in the installed package(s) 220 and the objects in the persistent data store 210), the server 205 may generate one or more objects indicating the error that occurs during the testing. In some cases, the error may be an example of an information error, such as an execution exception, a data error, or some combination of these or other types of errors. In some examples, an error may be due to a custom process flow defined by a tenant or user, a database customization defined by a tenant or user, an unfulfilled package dependency, or any combination thereof.

In some examples, the server 205 may automatically perform one or more updates to fix an identified error. For example, the server 205 may modify a package 220 (e.g., modify the objects defined by the package 220, modify a mapping between the objects of the package 220 and objects stored in a persistent system, modify a process flow defined for the package 220, modify a permission for the package 220 or a persistent system, apply a customization to the package 220, or apply any combination of these or other modifications) based on the error. The server 205 may apply any modifications to the package 220 in the in-memory testing environment 225. In some cases, the server 205 may re-test the package 220 using the modifications to check whether the modifications overcome the identified error.

Additionally or alternatively, the server 205 may surface one or more identified errors 240 to a user at the user device 215. For example, the user device 215 may present (e.g., display) an indication of the identified errors 240 and corresponding suggested updates to potentially overcome the errors 240. A user operating the user device 215 may select one or more updates to perform from the suggested updates, and the server 205 may apply the selected updates in the in-memory testing environment 225. The server 205 may re-test the package 220 based on the updates.

In some cases, the server 205 may perform multiple rounds of iterations when testing package installation. For example, the server 205 may repeatedly perform any number of rounds of testing, error detection, and updating. Additionally or alternatively, the server 205 may perform a same test multiple times according to different user profiles (e.g., in order to test user-specific customizations). In some cases, the server 205 may detect an incompatible package 220 based on the testing and may suggest not installing the incompatible package 220. In some such cases, the server 205 may halt installation and may refrain from pushing updates related to the incompatible package 220 to the persistent data store 210.

If testing passes for a package 220 or set of packages 220, the server 205 may automatically install the package 220 or set of packages 220 for the tenant to run on the persistent data store 210. For example, the server 205 may not determine any errors (e.g., conflicts between the objects for the package 220 and the objects in the subset of data 235) when running the tests defined in the metadata testing file 230 within the in-memory testing environment 225. If the server 205 performed any updates to overcome or mitigate identified errors during testing, the server 205 may include the updates when installing the package 220 to a persistent system (e.g., a tenant's production environment). By first testing the package 220 in memory at the server 205, the system 200 may determine that installing the package 220 to run on the persistent data store 210 for the tenant may not break process flows or customizations for that tenant. In some examples, the tenant's production environment may remain live while the package 220 installation is performed.

Because the system 200 may support a multi-tenant cloud computing platform, the server 205 may support multiple tenant environments. For example, the server 205 may support multiple tenant-specific metadata testing files 230, multiple tenant-specific in-memory testing environments 225, or a combination thereof. The server 205 may implement one or more techniques to manage the sharing of resources between tenants. For example, the server 205 may limit a number of processing resources available for package testing for each tenant. Furthermore, by creating the in-memory testing environments 225, the server 205 may protect against data leakage between tenants. Additionally or alternatively, the server 205 may implement one or more security protocols to ensure secure transfer of data between the server 205 and the persistent data store 210, as well as secure handling of data in memory at the server 205.

Figure 3:
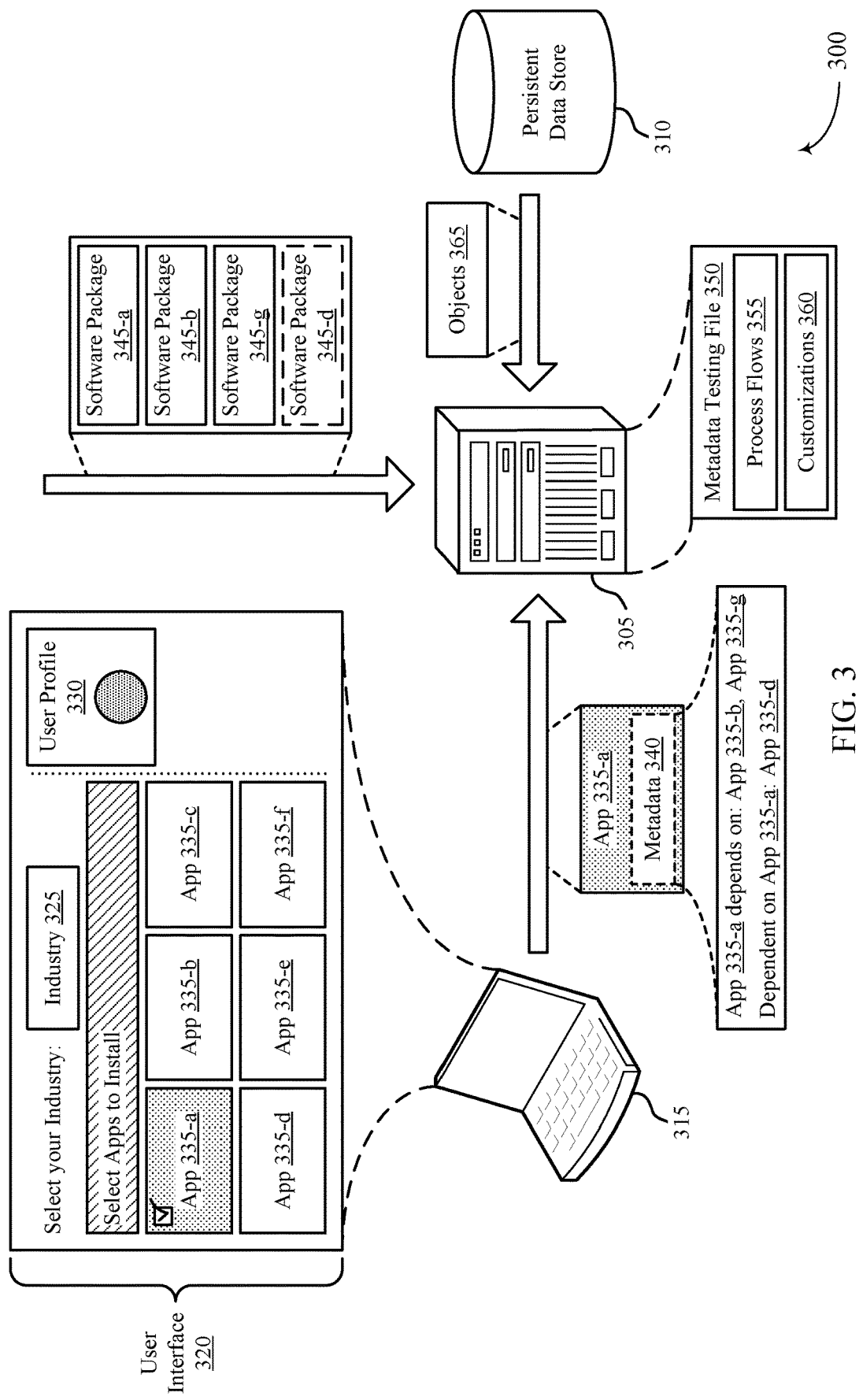

FIG. 3 illustrates an example of a system 300 that supports in-memory software package installation and testing in accordance with aspects of the present disclosure. In some examples, the system 300 may implement aspects of a system 100 or 200 as described with reference to FIGS. 1 and 2. For example, the system 300 may be an aspect of a multi-tenant cloud computing platform. The system 300 may include a server 305, a persistent data store 310, and a user device 315, which may be examples of the corresponding devices described with reference to FIG. 2. The system 300 may support resolving package dependencies for package installation testing.

The user device 315 may display a set of packages for installation in a user interface 320. For example, the user interface 320 may include a set of applications 335 that may be installed for a user or tenant, where each application 335 corresponds to a software package 345. In some cases, the applications 335 may be related to one or more industries, one or more users or user types, or a combination thereof. For example, a user may login to a user profile 330, select an industry 325, or both, and the user device 315 may display a set of applications 335 based on the user profile 330, the industry 325, or both. The user operating the user device 315 may select one or more applications 335 in the user interface 320 for installation. For example, as illustrated, the user may select application 335-*a*.

An application 335 may include a number of dependencies. In some cases, the dependencies for an application 335 may be based on the metadata 340 for a software package 345 corresponding to the application 335. In some examples, a server 305 may automatically generate a dependency tree for an application 335 by analyzing the metadata 340 for the application 335, an industry 325 (e.g., an industry tag, an industry 325 selected by a user, etc.), or both. The dependency tree may auto-detect and map dependencies for applications 335, software packages 345, or a combination thereof. Software packages 345 may be automatically installed, upgraded, suggested for installation, suggested for upgrading, or some combination thereof according to the metadata-driven dependency tree.

For example, application 335-*a* may include metadata 340, which may define the dependencies for application 335-*a*. The dependencies may include other applications 335 presented in the user interface 320, other applications 335 not presented in the user interface 320, or a combination thereof. As illustrated, application 335-*a* may depend on application 335-*b* and application 335-*g*. Additionally or alternatively, application 335-*d* may depend on application 335-*a*. When a user selects to install application 335-*a*, the system 300 (e.g., the user device 315, the server 305, or another device) may analyze the metadata 340 for application 335-*a* and determine the dependencies. In some cases, the system 300 may automatically install the applications 335 on which application 335-*a* depends (e.g., if these applications 335 are not currently installed). Additionally or alternatively, the system 300 may automatically install—or suggest installation of—the applications 335 that depend on application 335-*a* (e.g., if these applications 335 are not currently installed). As such, selecting application 335-*a* may automatically identify application 335-*b*, application 335-*g*, application 335-*d*, or a combination thereof for installation. Based on the user selection as illustrated, the system 300 may not install application 335-*c*, application 335-*e*, or application 335-*f*.

In some cases, each application 335 may correspond to a software package 345. That is, an application exchange for the applications 335 may be metadata-driven, such that each application 335 may be defined by a software package 345 that can be considered a set of metadata 340 including objects, page layouts, fields, mappings, or some combination of these or other metadata definitions. For example, application 335-*a* may correspond to software package 345-*a*, application 335-*b* may correspond to software package 345-*b*, application 335-*g* may correspond to software package 345-*g*, and application 335-*d* may correspond to software package 345-*d*. The dependencies between the applications 335 may be based on the objects defined in the software packages 345. For example, software package 345-*a* may include an Employee object. The Employee object may be related to an Account object, which may be defined in software package 345-*b*. However, software packages 345-*a* and 345-*b* may fail to communicate with each other. Software package 345-*g* may support communication between software packages 345-*a* and 345-*b*, such that the Employee objects and Account objects may interact properly. In such an example, software package 345-*a* may depend on software packages 345-*b* and 345-*g* to properly support installing and instantiating the Employee object.

The server 305 may install the software packages 345 into an in-memory data store for testing. In some examples, the server 305 may install the software packages 345 in a specific order to support the dependencies between the software packages 345. The server 305 may determine the installation order based on analyzing metadata 340 for one or more of the software packages 345.

The server 305 may perform automated testing on the software packages 345 installed in memory. The automated testing may be metadata-driven, for example, based on a configuration file (e.g., a metadata testing file 350). The configuration file may be customized for a specific tenant of a multi-tenant cloud computing platform. For example, the configuration file may define different test scenarios to run to check for any problems with software package 345 installation. A test scenario may correspond to a process flow, such as a business process, to run in a production environment on a persistent data store 310. The test scenarios (e.g., the process flows 355) may be defined for multiple different users, multiple different customizations 360, or some combination thereof. In some examples, using metadata, the server 305 may automatically detect one or more processes that a software package 345 may support or perform. The server 305 may integrate one or more of these processes into the testing, for example, using the metadata for the software packages 345, the metadata testing file 350, or a combination thereof.

The server 305 may refrain from running these automated tests on persistent systems. In some examples, the server 305 may pull objects 365 from a persistent data store 310 into memory and may run the automated tests on the objects 365 in a virtual environment hosted at least at the server 305. As such, all installations, operations, and updates involved in testing the software packages 345 may be performed at an in-memory data store of the server 305 or a set of servers 305. In some other examples, the system 300 may support running the automated tests on a sandbox. For example, the system 300 may replicate a tenant's production environment into a sandbox environment and may automatically run tests in the sandbox environment according to a set of dynamically inferred software packages 345, a customizable metadata testing file 350, or a combination thereof.

Figure 4:
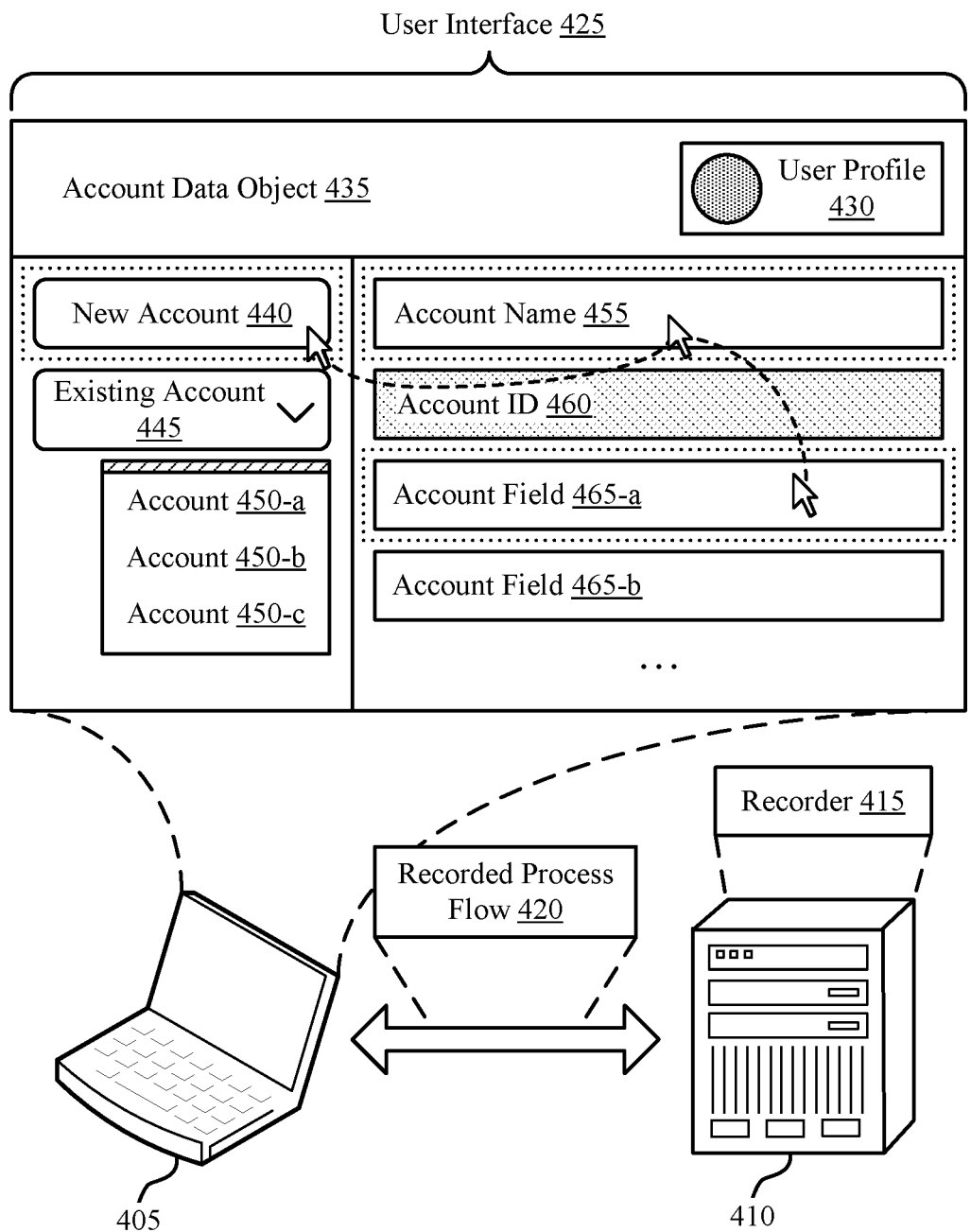
FIG. 4 illustrates an example of a recording technique that supports in-memory software package installation and testing in accordance with aspects of the present disclosure.

FIG. 4 illustrates an example of a recording technique 400 that supports in-memory software package installation and testing in accordance with aspects of the present disclosure. The recording technique 400 may support generating a set of tests for a metadata testing file. A system, such as a system 100, 200, or 300 as described with reference to FIGS. 1 through 3, may implement a recorder 415 at a server 410 (e.g., an application server, a database server, a cloud-based server, a virtual machine, a container, a worker, or any combination of these or other devices or systems supporting data processing) to perform the recording technique 400. In some examples, the recorder 415 may be referred to as a screen recorder. The recording technique 400 may track a set of user interactions, convert the user interactions into a metadata-driven set of instructions, and generate or update a metadata testing file to include at least the metadata-driven set of instructions.

The recorder 415 may record user interactions at a user device 405. In some cases, the recorder 415 may automatically record user interactions at the user device 405 and may determine common user processes based on the recorded information. In this way, the recorder 415 may capture one or more typical workflows for a set of users in an Org. In some other cases, a user may select for the recorder 415 to record a set of user interactions (e.g., in order to generate processes for package testing). For example, a user (e.g., an administrative user) may login and initiate the recording functionality of the recorder 415.

While recording, the recorder 415 may store data related to how a user interacts with the user interface 425 of the user device 405. For example, the recorder 415 may capture information related to mouse clicks, selected objects, selected fields, field inputs, page identifiers, page changes, format changes, mouse movements, scrolling, user information, permissions, timestamps, or any combination thereof. This information may be stored as a recorded process flow 420 for a particular user profile 430 or user type. In some examples, a user (e.g., an administrative user) may log in as different users by changing the user profile 430 to record process flows for different users or types of users. This may allow for robust package testing in an Org involving many different user roles. Each recorded process flow 420 may be passed to the server 410 for storage, generation of a metadata testing file, or both. For example, the server 410 may log each of the actions performed by the user in the user interface 425 and may convert each action or sets of actions into metadata-driven instructions for a configuration file. In some cases, a user may select whether to implement a recorded process flow 420 in package testing. Additionally or alternatively, a user may remove one or more recorded process flows 420 (e.g., out-of-date process flows) from testing, and the server 410 may update a metadata testing file to remove the corresponding metadata-driven set of instructions.

In some examples, the recording may be performed on objects and customizations in a production environment. Such a recorded process flow 420 may correspond to a test to ensure that a package selected for installation does not negatively affect the recorded process flow 420. In some other examples, the recording may be performed on objects and customizations in a virtual environment (e.g., an in-memory data store of at least a first server). Such a recorded process flow 420 may allow a user to view how installing a package may affect one or more pages, objects, fields, selections, or a combination thereof. For example, a user may see which errors are thrown when the user performs specific actions or may identify additional errors (e.g., language inconsistencies, etc.). In some cases, the server 410 may run a recorded process flow 420 in a virtual environment and may allow a user to view the recorded process flow 420 in a user interface 425 (e.g., to catch potential issues).

In a specific example, as illustrated, a user may record an interaction with an account data object 435. The user may select a specific user profile 430. The user may click on "New Account" 440 and may change one or more fields values. For example, the user may click on "Account Name" 455 and may update the name of the new Account object. Additionally or alternatively, the user may click on an "Account Field" 465-*a* and may input a value for this field. Additionally or alternatively, the user may interact with an "Account Identifier" 460, an "Account Field" 465-*b*, an "Existing Account" 445 (e.g., such as Account 450-*a*, Account 450-*b*, Account 450-*c*, or some combination thereof), or any combination of these or other fields, values, pages, etc. The recorder 415 may log all of the actions performed in the user interface 425 as a recorded process flow 420 associated with the selected user profile 430 (or a user profile of the user interacting with the user interface 425).

Figure 5:
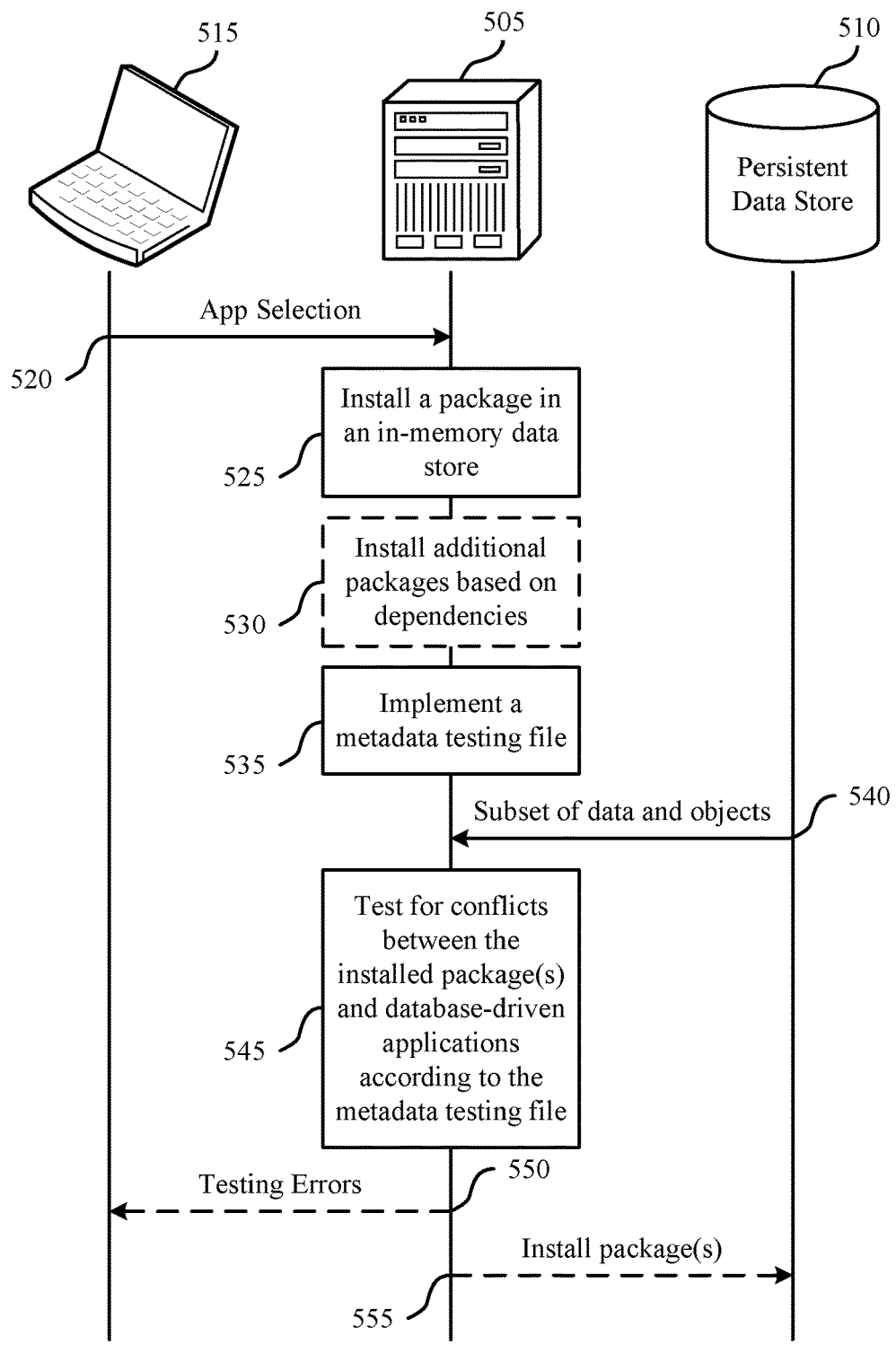
FIG. 5 illustrates an example of a process flow that supports in-memory software package installation and testing in accordance with aspects of the present disclosure.

FIG. 5 illustrates an example of a process flow 500 that supports in-memory software package installation and testing in accordance with aspects of the present disclosure. The process flow 500 may implement aspects of a cloud computing system, such as a system 100, 200, or 300 as described herein with reference to FIGS. 1 through 3. The process flow 500 may include at least one server 505 for in-memory testing of a package. In some examples, the process flow 500 may further include a persistent data store 510 (e.g., as part of a persistent system supporting a production environment) and a user device 515 communicating with the server 505. These devices may be examples of the corresponding devices described with reference to FIGS. 2 through 4. Alternative examples of the following may be implemented, where some steps are performed in a different order than described or are not performed at all. In some cases, steps may include additional features not mentioned below, or further steps may be added.

At 520, a user may select an application to install for a specific tenant of a cloud computing platform. In some cases, the user may select the application from a set of applications displayed in a user interface of a user device 515. The application may correspond to a software package and may be defined based on a set of metadata. The user's application selection may be sent to the server 505 for analysis.

At 525, the server 505 may install the software package corresponding to the selected application into an in-memory data store of at least the server 505. The software package may include a first set of objects, for example, defined in metadata for the software package. In some cases, at 530, the server 505 may further install one or more additional software packages into the in-memory data store of at least the server 505. For example, the server 505 may analyze the metadata for the software package and determine one or more additional software packages associated with the software package based on the analyzed metadata. In some cases, the server 505 may construct a dependency tree based on metadata-driven dependencies, industry tags, or some combination thereof and may determine a list of software packages associated with the software package to install. In some examples, the server 505 may automatically install one or more of the related software packages. In some other examples, the server 505 may surface a list of related software packages to a user (e.g., at the user device 515) and the user may select which additional software packages to install.

At 535, the server 505 may implement a metadata testing file at the in-memory data store of at least the server 505. For example, a system (e.g., a cloud computing platform) may make the metadata testing file available to at least the server 505 for package testing. The metadata testing file may be an example of a metadata-driven configuration file, such as an XML file, a JSON file, or some other metadata file. The metadata testing file may include a set of process flows to test, a set of customizations associated with a tenant to test, or a combination thereof.

At 540, the server 505 may retrieve, from a dataset stored for the tenant in a persistent data store 510, a subset of data for the tenant. For example, the server 505 may retrieve a second set of objects for a database-driven application associated with the dataset. The second set of objects (e.g., a subset of data for the tenant stored in the persistent system) may be selected based on the metadata testing file, the dataset stored for the tenant in the persistent data store 510, a sampling procedure, or a combination thereof. For example, the server 505 may sample a subset of data and objects to pull into the virtual testing environment at the server 505 in order to support each test defined in the metadata testing file. The server 505 may store the retrieved second set of objects at the in-memory data store of at least the server 505.

At 545, the server 505 may test the installed software package(s) at the in-memory data store of at least the server 505 using the metadata testing file. By testing in the in-memory data store—and not using any data or database-driven applications in a tenant's production environment—the server 505 may refrain from committing any transactions to a persistent system during testing of the software package(s). For example, the server 505 may test for conflicts between the first set of objects (e.g., for the installed software package and any additional installed software packages) and the second set of objects (e.g., sampled from the tenant's production environment) using at least the server 505. The server 505 may test the installed software package(s) by operating the installed software package(s) according to the metadata testing file and based on the retrieved second set of objects (e.g., for one or more database-driven applications running on the persistent data store 510). In some examples, the server 505 may identify a conflict due to an information error, such as an execution exception, a data error, or any other error identified during testing. In some such examples, the server 505 may generate one or more objects indicating the information error that occurred during testing.

At 550, the server 505 may surface one or more errors (e.g., information errors) detected during testing to a user at a user device 515. In some cases, the user may select changes to apply based on the errors. In some other cases, the server 505 may automatically apply one or more changes based on the detected errors. The changes may involve updates to one or more software packages (e.g., updates to the first set of objects for the software package(s)), updates to one or more permissions, new or modified tenant-specific customizations, updates to data mappings, or any combination thereof. The server 505 may apply the updates in the in-memory data store of at least the server 505 and may re-test the installed software package(s). In some implementations, the server 505 may perform multiple rounds of testing and updates to ensure that installing a software package does not break a tenant's process flows or customizations.

If the testing is successful (e.g., the server 505 receives a success result based on the testing), at 555, the server 505 may automatically install the software package(s) for the tenant at the persistent data store 510 based on the success result. As such, the installed software package(s) may support one or more database-driven applications and may operate within the tenant's production environment. The server 505 may further apply any updates used in the in-memory data store to resolve conflicts to the production environment in order to resolve similar conflicts for the installed software package(s). In this way, the server 505 may automatically ensure (e.g., based on metadata) that installing one or more software packages in the tenant's production environment is unlikely to break a process flow or a customization for that tenant.

Figure 6:
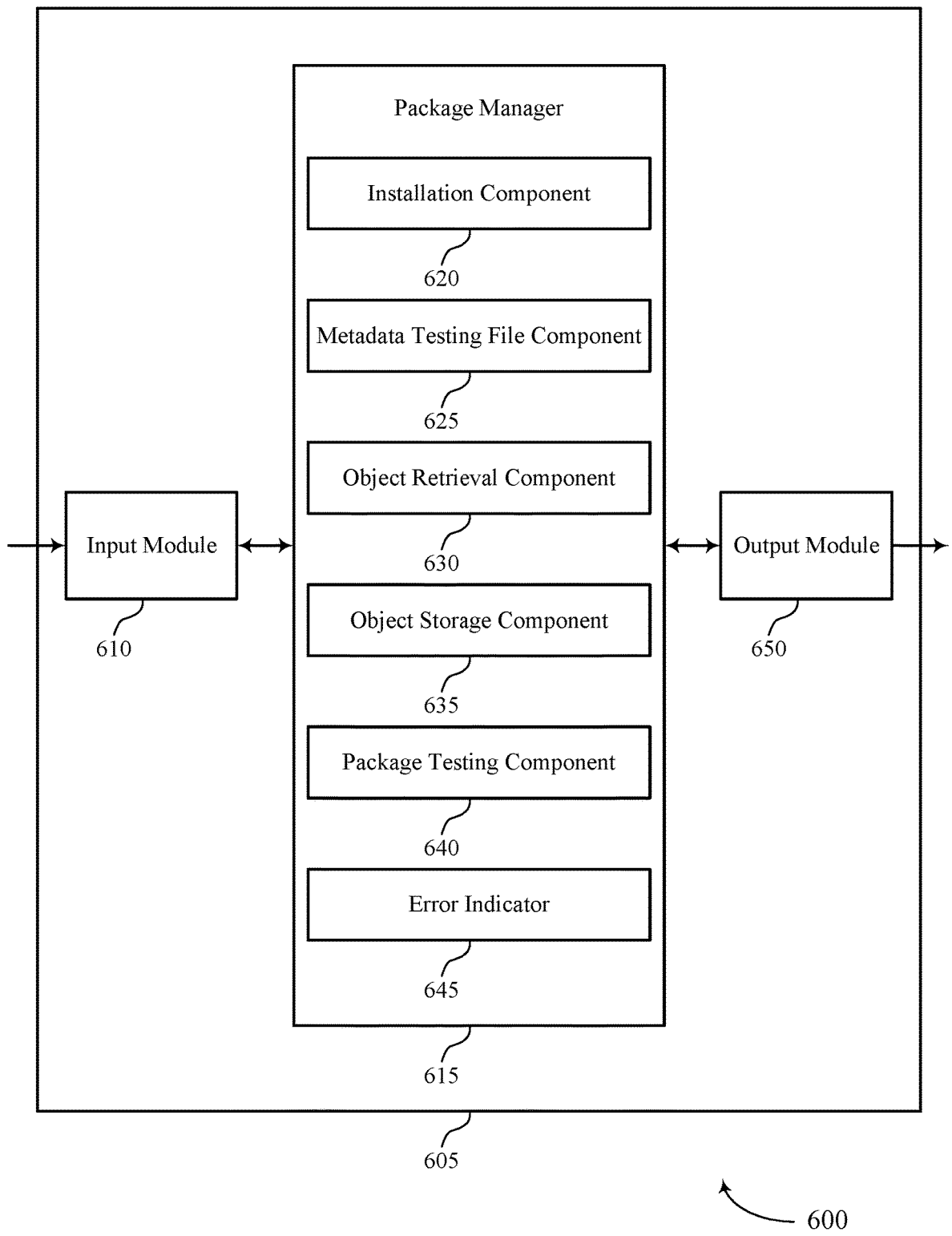
FIG. 6 shows a block diagram of an apparatus that supports in-memory software package installation and testing in accordance with aspects of the present disclosure.

FIG. 6 shows a block diagram 600 of an apparatus 605 that supports in-memory software package installation and testing in accordance with aspects of the present disclosure. The apparatus 605 may include an input module 610, a package manager 615, and an output module 650. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the package manager 615 to support in-memory software package installation and testing. In some cases, the input module 610 may be a component of an input/output (I/O) controller 815 as described with reference to FIG. 8.

The package manager 615 may include an installation component 620, a metadata testing file component 625, an object retrieval component 630, an object storage component 635, a package testing component 640, and an error indicator 645. The package manager 615 may be an example of aspects of the package manager 705 or 810 described with reference to FIGS. 7 and 8.

The package manager 615 and/or at least some of its various sub-components may be implemented in hardware, software executed by a processor, firmware, or any combination thereof. If implemented in software executed by a processor, the functions of the package manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The package manager 615 and/or at least some of its various sub-components may be physically located at various positions, including being distributed such that portions of functions are implemented at different physical locations by one or more physical devices. In some examples, the package manager 615 and/or at least some of its various sub-components may be a separate and distinct component in accordance with various aspects of the present disclosure. In other examples, the package manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The installation component 620 may install a software package having a first set of objects into an in-memory data store of at least a first server. The metadata testing file component 625 may make available to at least the first server a metadata testing file including a set of process flows and a set of customizations associated with a tenant and the installed software package.

The object retrieval component 630 may retrieve, from a dataset stored for the tenant in a persistent data store, a second set of objects for a database-driven application associated with the dataset based on the metadata testing file and a sampling procedure. The object storage component 635 may store the retrieved second set of objects for the database-driven application at the in-memory data store of at least the first server.

The package testing component 640 may test for a conflict between the first set of objects and the second set of objects using at least the first server by operating the installed software package according to the metadata testing file and based on the retrieved second set of objects for the database-driven application, where the conflict is due to at least an information error including an execution exception, a data error, or both. The error indicator 645 may generate one or more objects indicating the information error that occurs during the testing.

The output module 650 may manage output signals for the apparatus 605. For example, the output module 650 may receive signals from other components of the apparatus 605, such as the package manager 615, and may transmit these signals to other components or devices. In some specific examples, the output module 650 may transmit output signals for display in a user interface, for storage in a database or data store, for further processing at a server or server cluster, or for any other processes at any number of devices or systems. In some cases, the output module 650 may be a component of an I/O controller 815 as described with reference to FIG. 8.

Figure 7:
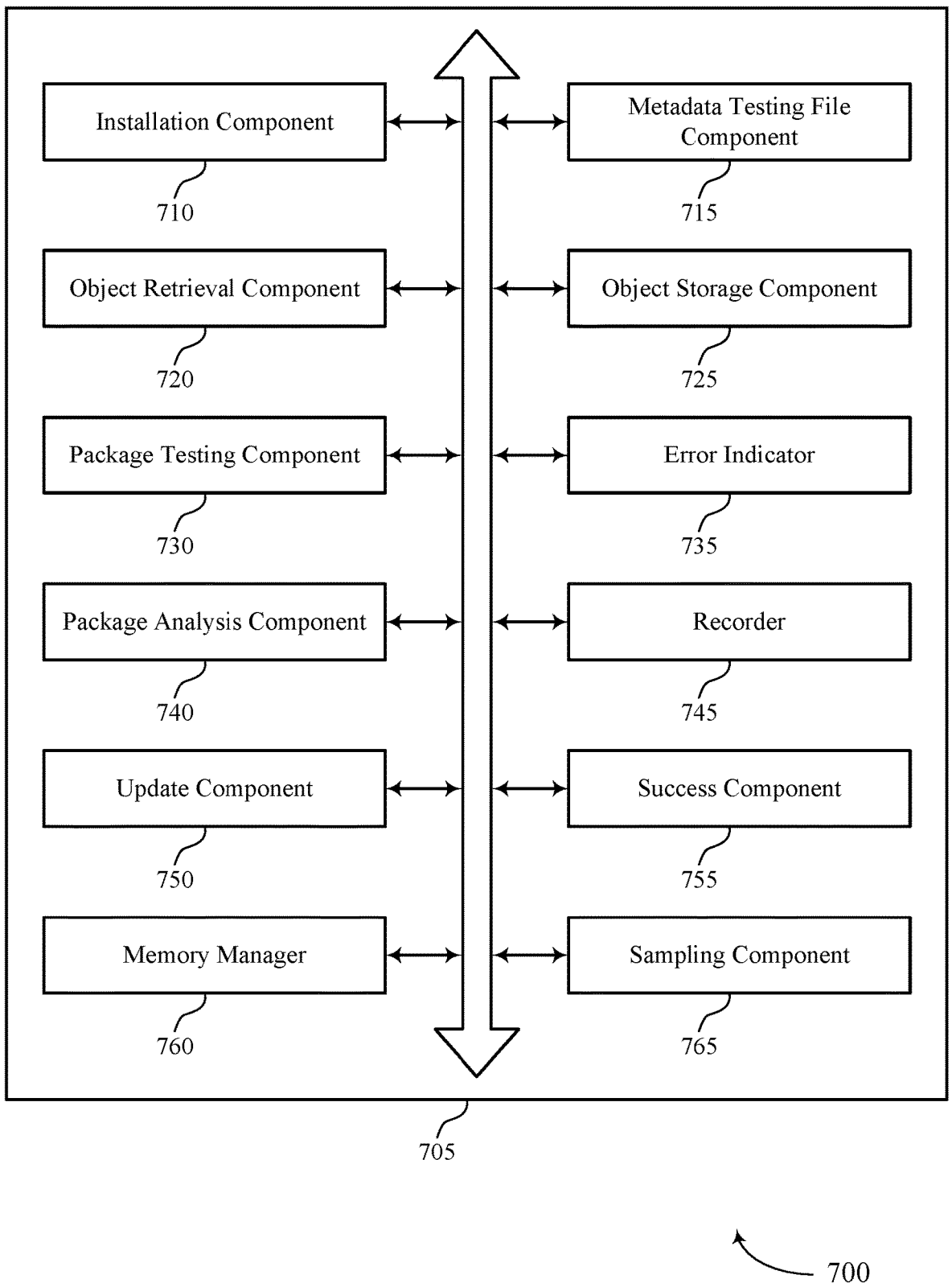
FIG. 7 shows a block diagram of a package manager that supports in-memory software package installation and testing in accordance with aspects of the present disclosure.

FIG. 7 shows a block diagram 700 of a package manager 705 that supports in-memory software package installation and testing in accordance with aspects of the present disclosure. The package manager 705 may be an example of aspects of a package manager 615 or a package manager 810 described herein. The package manager 705 may include an installation component 710, a metadata testing file component 715, an object retrieval component 720, an object storage component 725, a package testing component 730, an error indicator 735, a package analysis component 740, a recorder 745, an update component 750, a success component 755, a memory manager 760, a sampling component 765, or any combination of these or other components. Each of these components may communicate, directly or indirectly, with one another (e.g., via one or more buses).

The installation component 710 may install a software package having a first set of objects into an in-memory data store of at least a first server. The metadata testing file component 715 may make available to at least the first server a metadata testing file including a set of process flows and a set of customizations associated with a tenant and the installed software package. In some cases, the metadata testing file may be an example of a tenant-specific XML file, a tenant-specific JSON file, or a combination thereof.

The object retrieval component 720 may retrieve, from a dataset stored for the tenant in a persistent data store, a second set of objects for a database-driven application associated with the dataset based on the metadata testing file and a sampling procedure. The object storage component 725 may store the retrieved second set of objects for the database-driven application at the in-memory data store of at least the first server.

The package testing component 730 may test for a conflict between the first set of objects and the second set of objects using at least the first server by operating the installed software package according to the metadata testing file and based on the retrieved second set of objects for the database-driven application, where the conflict may be due to at least an information error including an execution exception, a data error, or both. The error indicator 735 may generate one or more objects indicating the information error that occurs during the testing.

The package analysis component 740 may analyze metadata for the software package and determine one or more additional software packages associated with the software package based on the analyzed metadata. The installation component 710 may install the one or more additional software packages into the in-memory data store of at least the first server, where the testing may involve the package testing component 730 testing the installed software package and the installed one or more additional software packages at the in-memory data store using at least the first server.

In some examples, the package analysis component 740 may send, for display in a user interface of a user device, an indication of the one or more additional software packages and may receive, from the user device, a user input indicating the one or more additional software packages, where the one or more additional software packages are installed based on the user input. Additionally or alternatively, the package analysis component 740 may determine an order for installing the software package and the one or more additional software packages based on the analyzed metadata, where the software package and the one or more additional software packages are installed according to the determined order.

The recorder 745 may record a set of user interactions with a user interface of a user device, where the set of user interactions corresponds to a process flow of the set of process flows for the tenant. In some examples, the recorder 745 may convert the set of user interactions into a metadata-driven set of instructions and may generate the metadata testing file to include at least the metadata-driven set of instructions. In some examples, the recorder 745 may record multiple sets of user interactions for a set of user profiles, where the metadata testing file is generated based on the recorded multiple sets of user interactions.

In some examples, the metadata testing file component 715 may send, for display in a user interface of a user device, an indication of the metadata testing file and may receive, from the user device, a user input defining at least a portion of the metadata testing file.

The update component 750 may update the first set of objects for the installed software package based on the one or more objects indicating the information error that occurs during the testing. In some examples, the package testing component 730 may re-test the installed software package based on the updating. The success component 755 may receive a success result based on the re-testing and may automatically install the software package for the tenant at the persistent data store based on the success result. In some examples, the memory manager 760 may flush the installed software package, the retrieved second set of objects for the database-driven application, or both from the in-memory data store of at least the first server based on the success result.

In some cases, the one or more objects indicating the information error that occurs during the testing may further indicate a set of changes for the first set of objects of the installed software package. The set of changes may resolve the conflict between the first set of objects and the second set of objects. In some examples, the update component 750 may automatically perform the set of changes for the first set of objects of the installed software package, and the package testing component 730 may re-test the installed software package based on the automatically performed set of changes. In some other examples, the update component 750 may send, for display in a user interface of a user device, the one or more objects indicating the information error that occurs during the testing. In some cases, the update component 750 may receive, from the user device, a user input indicating the set of changes for the first set of objects of the installed software package and may perform the set of changes for the first set of objects of the installed software package based on the user input. In some such cases, the package testing component 730 may re-test the installed software package based on the performed set of changes.

In some examples, the sampling procedure may involve the sampling component 765 selecting the second set of objects for the database-driven application associated with the dataset stored for the tenant in the persistent data store based on a resource threshold for the in-memory data store of at least the first server, a latency threshold for the testing, a set of objects associated with the set of process flows, the set of customizations, or both, a set of data fields associated with the set of process flows, the set of customizations, or both, or a combination thereof.

In some examples, the package testing component 730 may test a process flow of the set of process flows for the installed software package at the in-memory data store of at least the first server according to a first user profile and may test the process flow of the set of process flows for the installed software package at the in-memory data store of at least the first server according to a second user profile different from the first user profile.

In some examples, retrieving the second set of objects for the database-driven application may further involve the object retrieval component 720 retrieving the second set of objects for the database-driven application according to a data schema defined based on the set of customizations. In some such examples, the testing may further involve the package testing component 730 performing, at the in-memory data store of at least the first server, a set of processes on the retrieved second set of objects according to the set of process flows and based on the installed software package.

In some cases, the package analysis component 740 may analyze metadata for the software package and determine one or more processes defined by the software package based on the analyzed metadata. In some such cases, the package testing component 730 may perform, at the in-memory data store of at least the first server, the one or more processes on the retrieved second set of objects based on the installed software package.

In some examples, the package testing component 730 may refrain from committing a transaction to the persistent data store during the testing based on performing the one or more processes on the retrieved second set of objects at the in-memory data store of at least the first server. Additionally or alternatively, the package analysis component 740 may aggregate a process flow of the set of process flows from the metadata testing file to the one or more processes defined by the software package, where the one or more processes are performed on the retrieved second set of objects based on the aggregating. In some examples, the package analysis component 740 may send, for display in a user interface of a user device, an indication of the one or more processes defined by the software package.

In some examples, the tenant may be a first tenant of a multi-tenant cloud computing platform and the software package may be installed for the first tenant. The installation component 710 may install an additional software package for a second tenant of the multi-tenant cloud computing platform into the in-memory data store of at least the first server, and the memory manager 760 may manage resource sharing between the first tenant and the second tenant for the in-memory data store of at least the first server.

Figure 8:
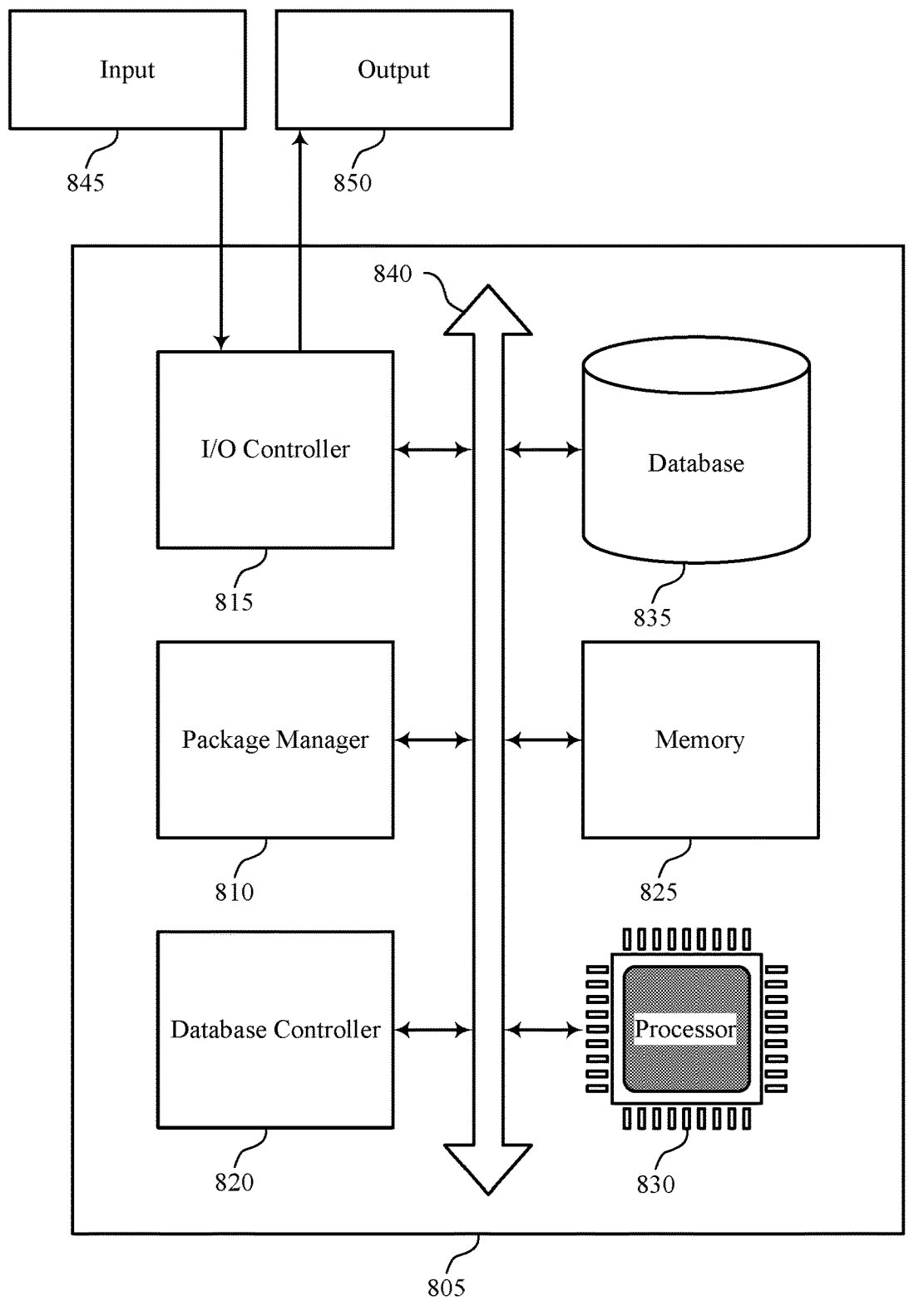
FIG. 8 shows a diagram of a system including a device that supports in-memory software package installation and testing in accordance with aspects of the present disclosure.

FIG. 8 shows a diagram of a system 800 including a device 805 that supports in-memory software package installation and testing in accordance with aspects of the present disclosure. The device 805 may be an example of or include the components of a server or an apparatus 605 as described herein. The device 805 may include components for bi-directional data communications including components for transmitting and receiving communications, including a package manager 810, an I/O controller 815, a database controller 820, memory 825, a processor 830, and a database 835. These components may be in electronic communication via one or more buses (e.g., bus 840).

The package manager 810 may be an example of a package manager 615 or 705 as described herein. For example, the package manager 810 may perform any of the methods or processes described above with reference to FIGS. 6 and 7. In some cases, the package manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic I/O system (BIOS) which may control basic hardware or software operation such as the interaction with peripheral components or devices.

The processor 830 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting in-memory software package installation and testing).

Figure 9:
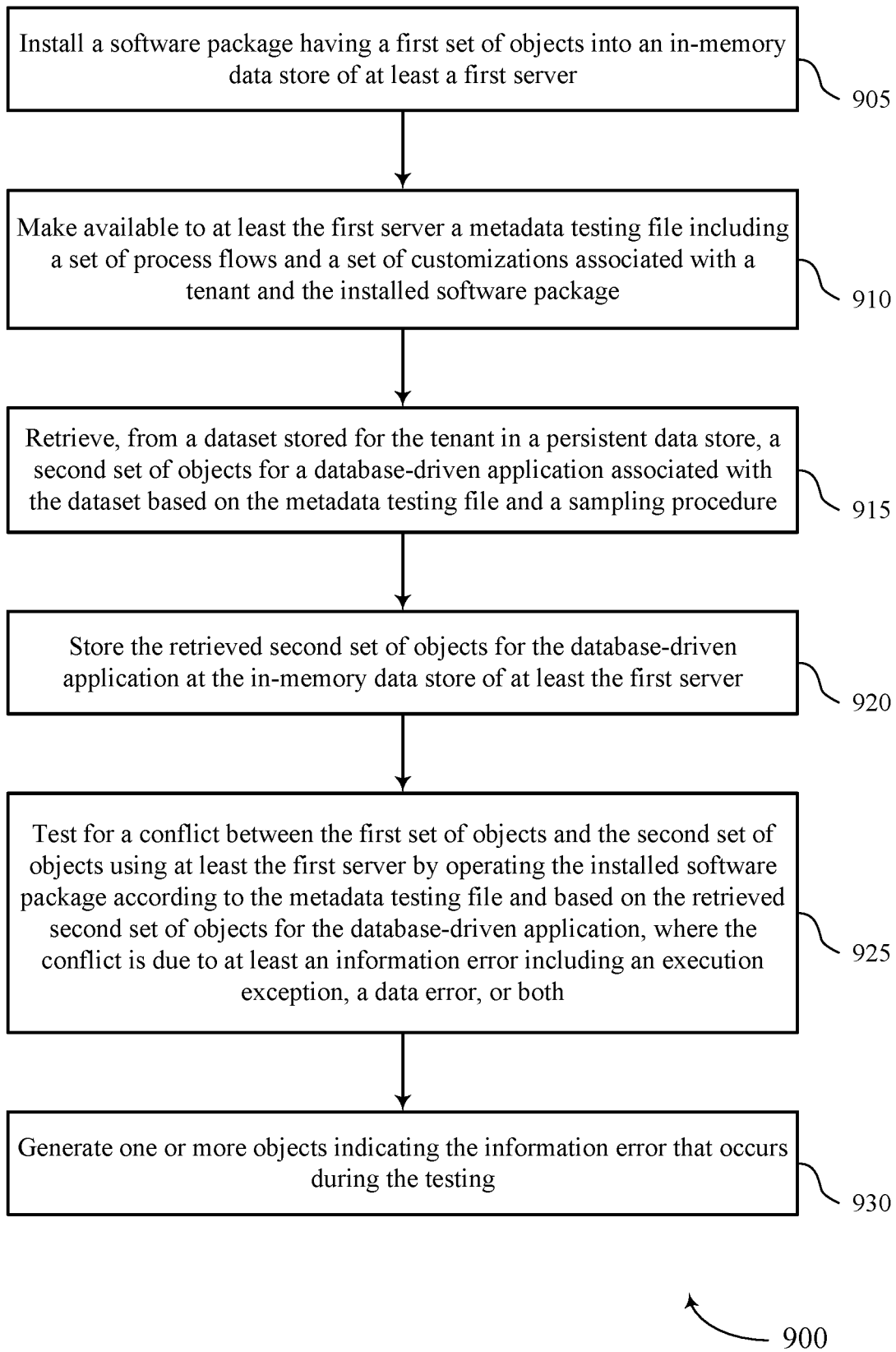
FIGS. 9 through 11 show flowcharts illustrating methods that support in-memory software package installation and testing in accordance with aspects of the present disclosure.

FIG. 9 shows a flowchart illustrating a method 900 that supports in-memory software package installation and testing in accordance with aspects of the present disclosure. The operations of method 900 may be implemented by a server (e.g., an application server, a database server, a cloud-based server, a server cluster, a virtual machine, a container, or any combination of these or other devices or systems supporting data processing) or its components as described herein. For example, the operations of method 900 may be performed by a package manager as described with reference to FIGS. 6 through 8. In some examples, a server may execute a set of instructions to control the functional elements of the server to perform the functions described below. Additionally or alternatively, a server may perform aspects of the functions described below using special-purpose hardware.

At 905, the server (e.g., a first server) may install a software package having a first set of objects into an in-memory data store of at least the first server. The operations of 905 may be performed according to the methods described herein. In some examples, aspects of the operations of 905 may be performed by an installation component as described with reference to FIGS. 6 through 8.

At 910, a system (e.g., a cloud computing system supporting the first server) may make available to at least the first server a metadata testing file. The metadata testing file may include a set of process flows and a set of customizations associated with a tenant and the installed software package. The operations of 910 may be performed according to the methods described herein. In some examples, aspects of the operations of 910 may be performed by a metadata testing file component as described with reference to FIGS. 6 through 8.

At 915, the server may retrieve, from a dataset stored for the tenant in a persistent data store, a second set of objects for a database-driven application associated with the dataset based on the metadata testing file, a sampling procedure, or both. The operations of 915 may be performed according to the methods described herein. In some examples, aspects of the operations of 915 may be performed by an object retrieval component as described with reference to FIGS. 6 through 8.

At 920, the server may store the retrieved second set of objects for the database-driven application at the in-memory data store of at least the first server. The operations of 920 may be performed according to the methods described herein. In some examples, aspects of the operations of 920 may be performed by an object storage component as described with reference to FIGS. 6 through 8.

At 925, the server may test for a conflict between the first set of objects and the second set of objects using at least the first server by operating the installed software package according to the metadata testing file and based on the retrieved second set of objects for the database-driven application. In some examples, the server may identify a conflict due to at least an information error such as an execution exception, a data error, or both. The operations of 925 may be performed according to the methods described herein. In some examples, aspects of the operations of 925 may be performed by a package testing component as described with reference to FIGS. 6 through 8.

At 930, the server may generate one or more objects indicating an information error that occurs during the testing. The operations of 930 may be performed according to the methods described herein. In some examples, aspects of the operations of 930 may be performed by an error indicator as described with reference to FIGS. 6 through 8.

Figure 10:
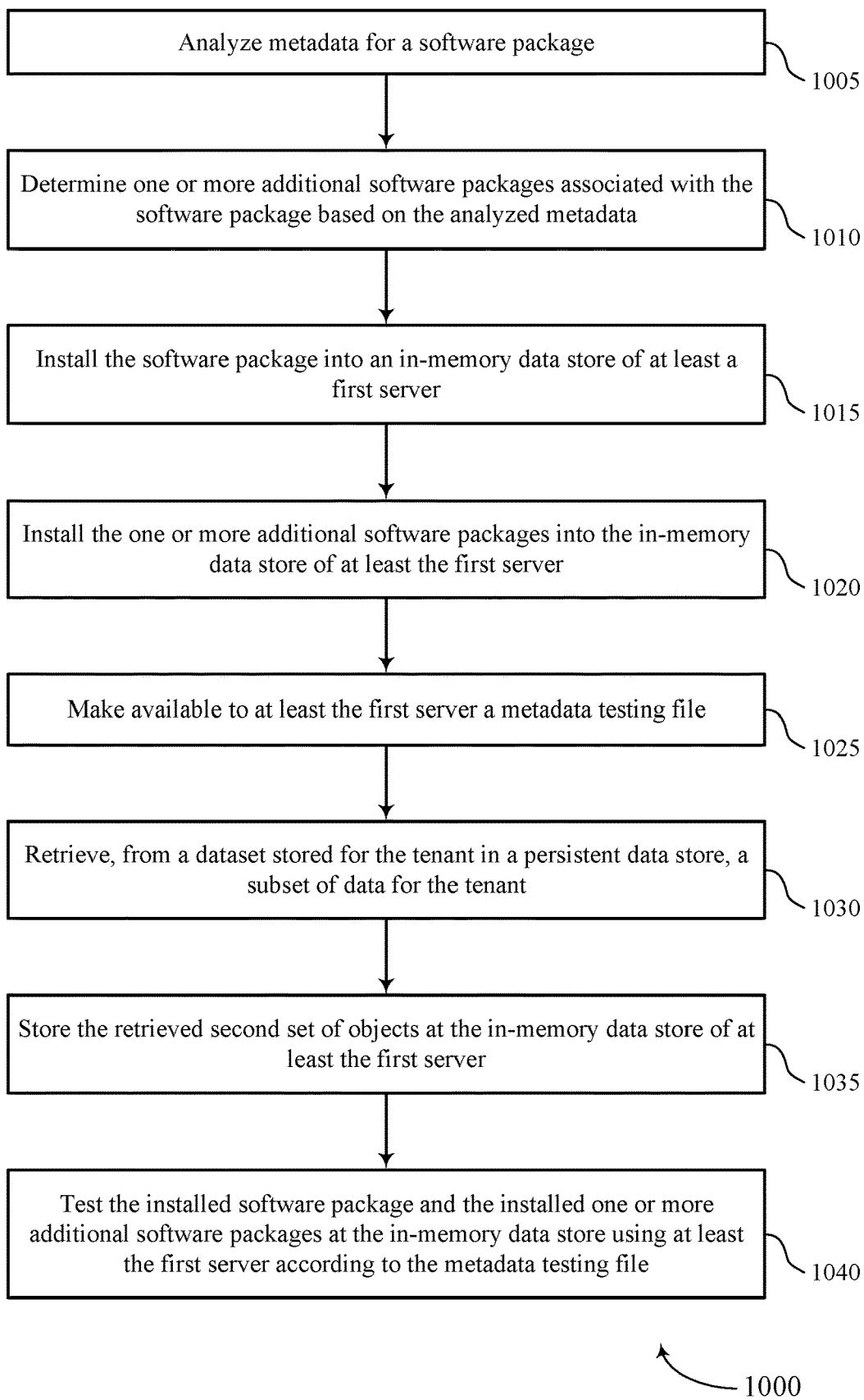

FIG. 10 shows a flowchart illustrating a method 1000 that supports in-memory software package installation and testing in accordance with aspects of the present disclosure. The operations of method 1000 may be implemented by a server or its components as described herein. For example, the operations of method 1000 may be performed by a package manager as described with reference to FIGS. 6 through 8. In some examples, a server may execute a set of instructions to control the functional elements of the server to perform the functions described below. Additionally or alternatively, a server may perform aspects of the functions described below using special-purpose hardware.

At 1005, the server may analyze metadata for a software package. The operations of 1005 may be performed according to the methods described herein. In some examples, aspects of the operations of 1005 may be performed by a package analysis component as described with reference to FIGS. 6 through 8.

At 1010, the server may determine one or more additional software packages associated with the software package based on the analyzed metadata. The operations of 1010 may be performed according to the methods described herein. In some examples, aspects of the operations of 1010 may be performed by a package analysis component as described with reference to FIGS. 6 through 8.

At 1015, the server may install the software package having a first set of objects into an in-memory data store of at least a first server. The operations of 1015 may be performed according to the methods described herein. In some examples, aspects of the operations of 1015 may be performed by an installation component as described with reference to FIGS. 6 through 8.

At 1020, the server may install the one or more additional software packages into the in-memory data store of at least the first server. The operations of 1020 may be performed according to the methods described herein. In some examples, aspects of the operations of 1020 may be performed by an installation component as described with reference to FIGS. 6 through 8.

At 1025, the server may make available to at least the first server a metadata testing file including a set of process flows and a set of customizations associated with a tenant and the installed software package. The operations of 1025 may be performed according to the methods described herein. In some examples, aspects of the operations of 1025 may be performed by a metadata testing file component as described with reference to FIGS. 6 through 8.

At 1030, the server may retrieve, from a dataset stored for the tenant in a persistent data store, a second set of objects for a database-driven application associated with the dataset based on the metadata testing file and a sampling procedure. The operations of 1030 may be performed according to the methods described herein. In some examples, aspects of the operations of 1030 may be performed by an object retrieval component as described with reference to FIGS. 6 through 8.

At 1035, the server may store the retrieved second set of objects for the database-driven application at the in-memory data store of at least the first server. The operations of 1035 may be performed according to the methods described herein. In some examples, aspects of the operations of 1035 may be performed by an object storage component as described with reference to FIGS. 6 through 8.

At 1040, the server may test the installed software package and the installed one or more additional software packages at the in-memory data store using at least the first server. For example, the server may test for conflicts between the first set of objects and the second set of objects using at least the first server by operating the installed software package, the one or more installed additional software packages, or a combination thereof according to the metadata testing file based on the retrieved second set of objects for the database-driven application. The server may identify any conflicts due to at least an information error including an execution exception, a data error, or both. The operations of 1040 may be performed according to the methods described herein. In some examples, aspects of the operations of 1040 may be performed by a package testing component as described with reference to FIGS. 6 through 8.

Figure 11:
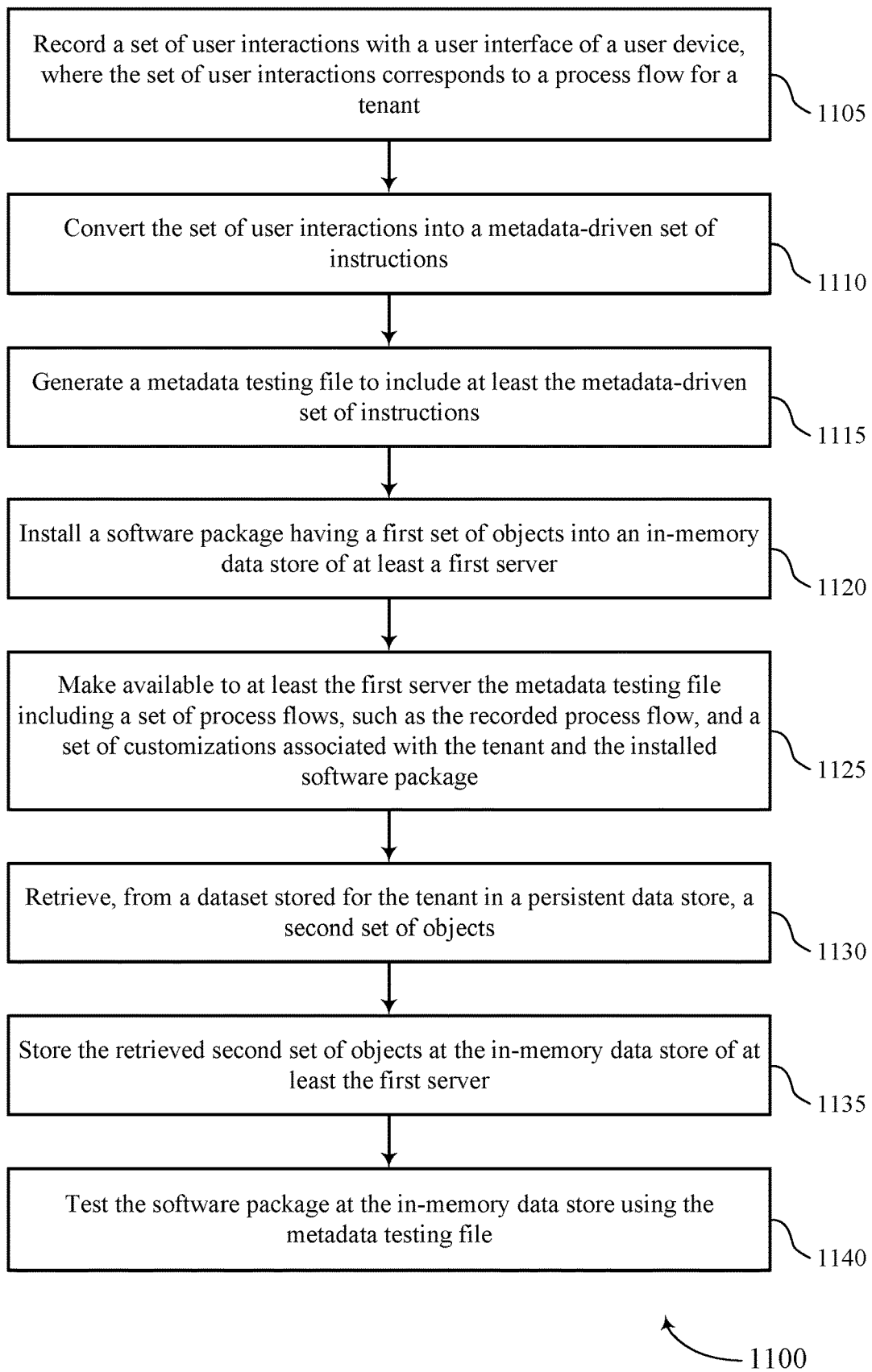

FIG. 11 shows a flowchart illustrating a method 1100 that supports in-memory software package installation and testing in accordance with aspects of the present disclosure. The operations of method 1100 may be implemented by a server or its components as described herein. For example, the operations of method 1100 may be performed by a package manager as described with reference to FIGS. 6 through 8. In some examples, a server may execute a set of instructions to control the functional elements of the server to perform the functions described below. Additionally or alternatively, a server may perform aspects of the functions described below using special-purpose hardware.

At 1105, the server may record a set of user interactions with a user interface of a user device, where the set of user interactions corresponds to a process flow for a tenant. The operations of 1105 may be performed according to the methods described herein. In some examples, aspects of the operations of 1105 may be performed by a recorder as described with reference to FIGS. 6 through 8.

At 1110, the server may convert the set of user interactions into a metadata-driven set of instructions. The operations of 1110 may be performed according to the methods described herein. In some examples, aspects of the operations of 1110 may be performed by a recorder as described with reference to FIGS. 6 through 8.

At 1115, the server may generate a metadata testing file to include at least the metadata-driven set of instructions. The operations of 1115 may be performed according to the methods described herein. In some examples, aspects of the operations of 1115 may be performed by a recorder as described with reference to FIGS. 6 through 8.

At 1120, the server may install a software package having a first set of objects into an in-memory data store of at least a first server. The operations of 1120 may be performed according to the methods described herein. In some examples, aspects of the operations of 1120 may be performed by an installation component as described with reference to FIGS. 6 through 8.

At 1125, the server may make available to at least the first server the metadata testing file including a set of process flows (e.g., including the process flow defined by the set of user interactions) and a set of customizations associated with the tenant and the installed software package. The operations of 1125 may be performed according to the methods described herein. In some examples, aspects of the operations of 1125 may be performed by a metadata testing file component as described with reference to FIGS. 6 through 8.

At 1130, the server may retrieve, from a dataset stored for the tenant in a persistent data store, a second set of objects for a database-driven application associated with the dataset based on the metadata testing file and a sampling procedure. The operations of 1130 may be performed according to the methods described herein. In some examples, aspects of the operations of 1130 may be performed by an object retrieval component as described with reference to FIGS. 6 through 8.

At 1135, the server may store the retrieved second set of objects for the database-driven application at the in-memory data store of at least the first server. The operations of 1135 may be performed according to the methods described herein. In some examples, aspects of the operations of 1135 may be performed by an object storage component as described with reference to FIGS. 6 through 8.

At 1140, the server may test for a conflict between the first set of objects and the second set of objects using at least the first server by operating the installed software package according to the metadata testing file and based on the retrieved second set of objects for the database-driven application. The operations of 1140 may be performed according to the methods described herein. In some examples, aspects of the operations of 1140 may be performed by a package testing component as described with reference to FIGS. 6 through 8.

A method for software package testing is described. The method may include installing a software package having a first set of objects into an in-memory data store of at least a first server and making available to at least the first server a metadata testing file including a set of process flows and a set of customizations associated with a tenant and the installed software package. The method may further include retrieving, from a dataset stored for the tenant in a persistent data store, a second set of objects for a database-driven application associated with the dataset based on the metadata testing file and a sampling procedure and storing the retrieved second set of objects for the database-driven application at the in-memory data store of at least the first server. The method may further include testing for a conflict between the first set of objects and the second set of objects using at least the first server by operating the installed software package according to the metadata testing file and based on the retrieved second set of objects for the database-driven application, where the conflict is due to at least an information error including an execution exception, a data error, or both, and generating one or more objects indicating the information error that occurs during the testing.

An apparatus for software package testing is described. The apparatus may include a processor, memory coupled with the processor, and instructions stored in the memory. The instructions may be executable by the processor to cause the apparatus to install a software package having a first set of objects into an in-memory data store of at least a first server and make available to at least the first server a metadata testing file including a set of process flows and a set of customizations associated with a tenant and the installed software package. The instructions may be further executable by the processor to cause the apparatus to retrieve, from a dataset stored for the tenant in a persistent data store, a second set of objects for a database-driven application associated with the dataset based on the metadata testing file and a sampling procedure and store the retrieved second set of objects for the database-driven application at the in-memory data store of at least the first server. The instructions may be further executable by the processor to cause the apparatus to test for a conflict between the first set of objects and the second set of objects using at least the first server by operating the installed software package according to the metadata testing file and based on the retrieved second set of objects for the database-driven application, where the conflict is due to at least an information error including an execution exception, a data error, or both, and generate one or more objects indicating the information error that occurs during the testing.

Another apparatus for software package testing is described. The apparatus may include means for installing a software package having a first set of objects into an in-memory data store of at least a first server and means for making available to at least the first server a metadata testing file including a set of process flows and a set of customizations associated with a tenant and the installed software package. The apparatus may further include means for retrieving, from a dataset stored for the tenant in a persistent data store, a second set of objects for a database-driven application associated with the dataset based on the metadata testing file and a sampling procedure and means for storing the retrieved second set of objects for the database-driven application at the in-memory data store of at least the first server. The apparatus may further include means for testing for a conflict between the first set of objects and the second set of objects using at least the first server by operating the installed software package according to the metadata testing file and based on the retrieved second set of objects for the database-driven application, where the conflict is due to at least an information error including an execution exception, a data error, or both, and means for generating one or more objects indicating the information error that occurs during the testing.

A non-transitory computer-readable medium storing code for software package testing is described. The code may include instructions executable by a processor to install a software package having a first set of objects into an in-memory data store of at least a first server and make available to at least the first server a metadata testing file including a set of process flows and a set of customizations associated with a tenant and the installed software package. The code may further include instructions executable by the processor to retrieve, from a dataset stored for the tenant in a persistent data store, a second set of objects for a database-driven application associated with the dataset based on the metadata testing file and a sampling procedure and store the retrieved second set of objects for the database-driven application at the in-memory data store of at least the first server. The code may further include instructions executable by the processor to test for a conflict between the first set of objects and the second set of objects using at least the first server by operating the installed software package according to the metadata testing file and based on the retrieved second set of objects for the database-driven application, where the conflict is due to at least an information error including an execution exception, a data error, or both, and generate one or more objects indicating the information error that occurs during the testing.

Some examples of the method, apparatuses, and non-transitory computer-readable medium described herein may further include operations, features, means, or instructions for analyzing metadata for the software package, determining one or more additional software packages associated with the software package based on the analyzed metadata, and installing the one or more additional software packages into the in-memory data store of at least the first server, where the testing includes testing the installed software package and the installed one or more additional software packages at the in-memory data store using at least the first server.

Some examples of the method, apparatuses, and non-transitory computer-readable medium described herein may further include operations, features, means, or instructions for sending, for display in a user interface of a user device, an indication of the one or more additional software packages and receiving, from the user device, a user input indicating the one or more additional software packages, where the one or more additional software packages may be installed based on the user input.

Some examples of the method, apparatuses, and non-transitory computer-readable medium described herein may further include operations, features, means, or instructions for determining an order for installing the software package and the one or more additional software packages based on the analyzed metadata, where the software package and the one or more additional software packages may be installed according to the determined order.

Some examples of the method, apparatuses, and non-transitory computer-readable medium described herein may further include operations, features, means, or instructions for recording a set of user interactions with a user interface of a user device, where the set of user interactions corresponds to a process flow of the set of process flows for the tenant, converting the set of user interactions into a metadata-driven set of instructions, and generating the metadata testing file to include at least the metadata-driven set of instructions.

In some examples of the method, apparatuses, and non-transitory computer-readable medium described herein, the recording may include operations, features, means, or instructions for recording multiple sets of user interactions for a set of user profiles, where the metadata testing file may be generated based on the recorded multiple sets of user interactions.

Some examples of the method, apparatuses, and non-transitory computer-readable medium described herein may further include operations, features, means, or instructions for sending, for display in a user interface of a user device, an indication of the metadata testing file and receiving, from the user device, a user input defining at least a portion of the metadata testing file.

Some examples of the method, apparatuses, and non-transitory computer-readable medium described herein may further include operations, features, means, or instructions for updating the first set of objects for the installed software package based on the one or more objects indicating the information error that occurs during the testing, re-testing the installed software package based on the updating, receiving a success result based on the re-testing, and automatically installing the software package for the tenant at the persistent data store based on the success result.

Some examples of the method, apparatuses, and non-transitory computer-readable medium described herein may further include operations, features, means, or instructions for flushing the installed software package, the retrieved second set of objects for the database-driven application, or both from the in-memory data store of at least the first server based on the success result.

In some examples of the method, apparatuses, and non-transitory computer-readable medium described herein, the one or more objects indicating the information error that occurs during the testing further indicate a set of changes for the first set of objects of the installed software package to resolve the conflict.

Some examples of the method, apparatuses, and non-transitory computer-readable medium described herein may further include operations, features, means, or instructions for automatically performing the set of changes for the first set of objects of the installed software package and re-testing the installed software package based on the automatically performed set of changes.

Some examples of the method, apparatuses, and non-transitory computer-readable medium described herein may further include operations, features, means, or instructions for sending, for display in a user interface of a user device, the one or more objects indicating the information error that occurs during the testing, receiving, from the user device, a user input indicating the set of changes for the first set of objects of the installed software package, performing the set of changes for the first set of objects of the installed software package based on the user input, and re-testing the installed software package based on the performed set of changes.

In some examples of the method, apparatuses, and non-transitory computer-readable medium described herein, the sampling procedure may include operations, features, means, or instructions for selecting the second set of objects for the database-driven application associated with the dataset stored for the tenant in the persistent data store based on a resource threshold for the in-memory data store of at least the first server, a latency threshold for the testing, a set of objects associated with the set of process flows, the set of customizations, or both, a set of data fields associated with the set of process flows, the set of customizations, or both, or a combination thereof.

In some examples of the method, apparatuses, and non-transitory computer-readable medium described herein, the testing further may include operations, features, means, or instructions for testing a process flow of the set of process flows for the installed software package at the in-memory data store of at least the first server according to a first user profile and testing the process flow of the set of process flows for the installed software package at the in-memory data store of at least the first server according to a second user profile different from the first user profile.

In some examples of the method, apparatuses, and non-transitory computer-readable medium described herein, retrieving the second set of objects for the database-driven application may further include retrieving the second set of objects for the database-driven application according to a data schema defined based on the set of customizations. In some such examples of the method, apparatuses, and non-transitory computer-readable medium described herein, the testing may further include performing, at the in-memory data store of at least the first server, a set of processes on the retrieved second set of objects according to the set of process flows and based on the installed software package.

Some examples of the method, apparatuses, and non-transitory computer-readable medium described herein may further include operations, features, means, or instructions for analyzing metadata for the software package and determining one or more processes defined by the software package based on the analyzed metadata, where the testing further may include operations, features, means, or instructions for performing, at the in-memory data store of at least the first server, the one or more processes on the retrieved second set of objects based on the installed software package.

In some examples of the method, apparatuses, and non-transitory computer-readable medium described herein, the performing further may include operations, features, means, or instructions for refraining from committing a transaction to the persistent data store during the testing based on performing the one or more processes on the retrieved second set of objects at the in-memory data store of at least the first server.

Some examples of the method, apparatuses, and non-transitory computer-readable medium described herein may further include operations, features, means, or instructions for aggregating a process flow of the set of process flows from the metadata testing file to the one or more processes defined by the software package, where the one or more processes may be performed on the retrieved second set of objects based on the aggregating.

Some examples of the method, apparatuses, and non-transitory computer-readable medium described herein may further include operations, features, means, or instructions for sending, for display in a user interface of a user device, an indication of the one or more processes defined by the software package.

In some examples of the method, apparatuses, and non-transitory computer-readable medium described herein, the tenant may be a first tenant of a multi-tenant cloud computing platform, and the software package may be installed for the first tenant. Some examples of the method, apparatuses, and non-transitory computer-readable medium described herein may further include operations, features, means, or instructions for installing an additional software package for a second tenant of the multi-tenant cloud computing platform into the in-memory data store of at least the first server and managing resource sharing between the first tenant and the second tenant for the in-memory data store of at least the first server.

In some examples of the method, apparatuses, and non-transitory computer-readable medium described herein, the metadata testing file includes a tenant-specific XML file, a tenant-specific JSON file, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for software package testing, comprising:
   installing a software package having a first set of objects into an in-memory data store of at least a first server;
   automatically generating a metadata testing file based at least in part on a set of process flows performed by a user of a tenant in a production environment for the tenant, wherein the metadata testing file comprises metadata for testing the installed software package with the set of process flows and a set of customizations associated with the tenant;
   making available to at least the first server the metadata testing file;
   retrieving, from a dataset stored for the tenant in a persistent data store, a subset of a second set of objects for a database-driven application associated with the dataset based at least in part on the metadata testing file and a sampling procedure, wherein the sampling procedure comprises pseudo-randomly selecting the subset of the second set of objects for testing based at least in part on the metadata testing file;
   storing the retrieved subset of the second set of objects for the database-driven application at the in-memory data store of at least the first server;
   testing for a conflict between the first set of objects and the subset of the second set of objects using at least the first server by operating the installed software package according to the metadata testing file and based at least in part on the retrieved subset of the second set of objects for the database-driven application, wherein the conflict is due to at least an information error between the first set of objects and the subset of the second set of objects including an execution exception, a data error, or both; and generating one or more objects indicating the information error that occurs during the testing.

2. The method of claim 1, further comprising:
analyzing metadata for the software package;
determining one or more additional software packages associated with the software package based at least in part on the analyzed metadata; and
installing the one or more additional software packages into the in-memory data store of at least the first server, wherein the testing comprises testing the installed software package and the installed one or more additional software packages at the in-memory data store using at least the first server.

3. The method of claim 2, further comprising:
sending, for display in a user interface of a user device, an indication of the one or more additional software packages; and
receiving, from the user device, a user input indicating the one or more additional software packages, wherein the one or more additional software packages are installed based at least in part on the user input.

4. The method of claim 2, further comprising:
determining an order for installing the software package and the one or more additional software packages based at least in part on the analyzed metadata, wherein the software package and the one or more additional software packages are installed according to the determined order.

5. The method of claim 1, further comprising:
recording a set of user interactions with a user interface of a user device, wherein the set of user interactions corresponds to a process flow of the set of process flows for the tenant;
converting the set of user interactions into a metadata-driven set of instructions; and
generating the metadata testing file to comprise at least the metadata-driven set of instructions.

6. The method of claim 5, wherein the recording comprises:
recording a plurality of sets of user interactions for a plurality of user profiles, wherein the metadata testing file is generated based at least in part on the recorded plurality of sets of user interactions.

7. The method of claim 1, further comprising:
sending, for display in a user interface of a user device, an indication of the metadata testing file; and
receiving, from the user device, a user input defining at least a portion of the metadata testing file.

8. The method of claim 1, further comprising:
updating the first set of objects for the installed software package based at least in part on the one or more objects indicating the information error that occurs during the testing;
re-testing the installed software package based at least in part on the updating;
receiving a success result based at least in part on the re-testing; and
automatically installing the software package for the tenant at the persistent data store based at least in part on the success result.

9. The method of claim 8, further comprising:
flushing the installed software package, the retrieved subset of the second set of objects for the database-driven application, or both from the in-memory data store of at least the first server based at least in part on the success result.

10. The method of claim 1, wherein the one or more objects indicating the information error that occurs during the testing further indicate a set of changes for the first set of objects of the installed software package to resolve the conflict.

11. The method of claim 10, further comprising:
automatically performing the set of changes for the first set of objects of the installed software package; and
re-testing the installed software package based at least in part on the automatically performed set of changes.

12. The method of claim 10, further comprising:
sending, for display in a user interface of a user device, the one or more objects indicating the information error that occurs during the testing;
receiving, from the user device, a user input indicating the set of changes for the first set of objects of the installed software package;
performing the set of changes for the first set of objects of the installed software package based at least in part on the user input; and
re-testing the installed software package based at least in part on the performed set of changes.

13. The method of claim 1, wherein the sampling procedure comprises:
selecting the subset of the second set of objects for the database-driven application associated with the dataset stored for the tenant in the persistent data store based at least in part on a resource threshold for the in-memory data store of at least the first server, a latency threshold for the testing, a set of objects associated with the set of process flows, the set of customizations, or both, a set of data fields associated with the set of process flows, the set of customizations, or both, or a combination thereof.

14. The method of claim 1, wherein the testing further comprises:
testing a process flow of the set of process flows for the installed software package at the in-memory data store of at least the first server according to a first user profile; and
testing the process flow of the set of process flows for the installed software package at the in-memory data store of at least the first server according to a second user profile different from the first user profile.

15. The method of claim 1, wherein:
retrieving the subset of the second set of objects for the database-driven application further comprises:
retrieving the subset of the second set of objects for the database-driven application according to a data schema defined based at least in part on the set of customizations; and
the testing further comprises:
performing, at the in-memory data store of at least the first server, a set of processes on the retrieved subset of the second set of objects according to the set of process flows and based at least in part on the installed software package.

16. The method of claim 1, further comprising:
analyzing metadata for the software package; and
determining one or more processes defined by the software package based at least in part on the analyzed metadata, wherein the testing further comprises:
performing, at the in-memory data store of at least the first server, the one or more processes on the retrieved subset of the second set of objects based at least in part on the installed software package.

17. The method of claim 16, wherein the performing further comprises:
refraining from committing a transaction to the persistent data store during the testing based at least in part on performing the one or more processes on the retrieved subset of the second set of objects at the in-memory data store of at least the first server.

18. The method of claim 16, further comprising:
aggregating a process flow of the set of process flows from the metadata testing file to the one or more processes defined by the software package, wherein the one or more processes are performed on the retrieved subset of the second set of objects based at least in part on the aggregating.

19. The method of claim 16, further comprising:
sending, for display in a user interface of a user device, an indication of the one or more processes defined by the software package.

20. The method of claim 1, wherein:
the tenant comprises a first tenant of a multi-tenant cloud computing platform; and
the software package is installed for the first tenant, the method further comprising:
installing an additional software package for a second tenant of the multi-tenant cloud computing platform into the in-memory data store of at least the first server; and
managing resource sharing between the first tenant and the second tenant for the in-memory data store of at least the first server.

21. The method of claim 1, wherein the metadata testing file comprises a tenant-specific extensible markup language (XML) file, a tenant-specific JavaScript object notation (JSON) file, or a combination thereof.

22. An apparatus for software package testing, comprising:
a processor;
memory coupled with the processor; and
instructions stored in the memory and executable by the processor to cause the apparatus to:
install a software package having a first set of objects into an in-memory data store of at least a first server;
automatically generate a metadata testing file based at least in part on a set of process flows performed by a user of a tenant in a production environment for the tenant, wherein the metadata testing file comprises metadata for testing the installed software package with the set of process flows and a set of customizations associated with the tenant;
make available to at least the first server the metadata testing file;
retrieve, from a dataset stored for the tenant in a persistent data store, a subset of a second set of objects for a database-driven application associated with the dataset based at least in part on the metadata testing file and a sampling procedure, wherein the sampling procedure comprises pseudo-randomly selecting the subset of the second set of objects for testing based at least in part on the metadata testing file;
store the retrieved subset of the second set of objects for the database-driven application at the in-memory data store of at least the first server;
test for a conflict between the first set of objects and the subset of the second set of objects using at least the first server by operating the installed software package according to the metadata testing file and based at least in part on the retrieved subset of the second set of objects for the database-driven application, wherein the conflict is due to at least an information error between the first set of objects and the subset of the second set of objects including an execution exception, a data error, or both; and
generate one or more objects indicating the information error that occurs during the testing.

23. A non-transitory computer-readable medium storing code for software package testing, the code comprising instructions executable by a processor to:
install a software package having a first set of objects into an in-memory data store of at least a first server;
automatically generate a metadata testing file based at least in part on a set of process flows performed by a user of a tenant in a production environment for the tenant, wherein the metadata testing file comprises metadata for testing the installed software package with the set of process flows and a set of customizations associated with the tenant;
make available to at least the first server the metadata testing file;
retrieve, from a dataset stored for the tenant in a persistent data store, a subset of a second set of objects for a database-driven application associated with the dataset based at least in part on the metadata testing file and a sampling procedure, wherein the sampling procedure comprises pseudo-randomly selecting the subset of the second set of objects for testing based at least in part on the metadata testing file;
store the retrieved subset of the second set of objects for the database-driven application at the in-memory data store of at least the first server;
test for a conflict between the first set of objects and the subset of the second set of objects using at least the first server by operating the installed software package according to the metadata testing file and based at least in part on the retrieved subset of the second set of objects for the database-driven application, wherein the conflict is due to at least an information error between the first set of objects and the subset of the second set of objects including an execution exception, a data error, or both; and
generate one or more objects indicating the information error that occurs during the testing.

* * * * *